US011291238B2

(12) United States Patent
Leadbeater et al.

(10) Patent No.: US 11,291,238 B2
(45) Date of Patent: Apr. 5, 2022

(54) SYSTEMS AND METHODS FOR AUTOMATED PRODUCTION OF CIGARETTES

(71) Applicant: EZJ AUTOROLLER, Inc., Silver City, NM (US)

(72) Inventors: Jack Leadbeater, Scottsdale, AZ (US); Trent Bohl, Silver City, NM (US); James O'Connor, Phoenix, AZ (US); John Kinnard, Scottsdale, AZ (US); Larry Miller, Chandler, AZ (US); Jesse Haws, Mesa, AZ (US); Riley Chicci, Tempe, AZ (US); Frank Ross, Tempe, AZ (US); Julie Stefl, Laveen, AZ (US); Yani Deros, Scottsdale, AZ (US)

(73) Assignee: UTEKTIK, INC., Scottsdale, AZ (US)

( * ) Notice: Subject to any disclaimer, the term of this patent is extended or adjusted under 35 U.S.C. 154(b) by 173 days.

(21) Appl. No.: 16/555,891

(22) Filed: Aug. 29, 2019

(65) Prior Publication Data
US 2020/0068947 A1    Mar. 5, 2020

Related U.S. Application Data

(60) Provisional application No. 62/724,955, filed on Aug. 30, 2018.

(51) Int. Cl.
*A24C 5/06* (2006.01)
*A24C 5/54* (2006.01)
(Continued)

(52) U.S. Cl.
CPC ............... *A24C 5/06* (2013.01); *A24C 5/002* (2013.01); *A24C 5/34* (2013.01); *A24C 5/395* (2013.01);
(Continued)

(58) Field of Classification Search
CPC .... A24C 5/02; A24C 5/06; A24C 5/00; A24C 1/38; A24C 1/30; A24C 1/02; A24C 5/42;
(Continued)

(56) References Cited

U.S. PATENT DOCUMENTS

| 970,110 A | 9/1910 | Pollak |
| 2,938,320 A | 5/1916 | Lesch |

(Continued)

FOREIGN PATENT DOCUMENTS

| WO | WO2017/172844 | 10/2017 |
| WO | WO2019/092477 | 5/2019 |

OTHER PUBLICATIONS

Project Provenance Ltd. "From Shore to Plate: Tracking Tuna on the Blockchain." Provenance, Project Provenance Ltd, Jul. 15, 2016, www.provenance.org/tracking-tuna-on-the-blockchain#introduction. (Year: 2016).*

(Continued)

*Primary Examiner* — Niki Bakhtiari
*Assistant Examiner* — Stephanie Lynn Moore
(74) *Attorney, Agent, or Firm* — Jennings, Strouss & Salmon, PLC

(57) ABSTRACT

An enclosed cannabis cigarette preparation system that includes an indexing module configured to accept a plurality of pre-rolled cones, each having a sealed end and an open end, and to move the pre-rolled cones through a plurality of stations. The system further includes a filling module configured to dispense, at a first station, a portion of cannabis shake material into the open end of each of the pre-rolled cones to form loosely filled cones; a tamping module configured to compress, at a second station, the cannabis shake material in each of the loosely filled cones to form tamped cones; a de-clogging module; and a pinching module (Continued)

configured to pinch-twist, at a third station, the open end of each of the pre-rolled cones to form rolled cigarettes.

11 Claims, 16 Drawing Sheets

(51) Int. Cl.
  *A24C 5/39* (2006.01)
  *A24C 5/34* (2006.01)
  *A24C 5/00* (2020.01)
  *G06K 7/14* (2006.01)
(52) U.S. Cl.
  CPC ............... *A24C 5/398* (2013.01); *A24C 5/54* (2013.01); *G06K 7/1413* (2013.01)
(58) Field of Classification Search
  CPC .. A24C 3/00; A24C 5/322; A24C 5/60; A24D 1/18; A24D 1/006; A24D 1/008; A24D 1/022; A24D 1/042
  See application file for complete search history.

(56) References Cited

U.S. PATENT DOCUMENTS

| | | | |
|---|---|---|---|
| 5,335,619 A * | 8/1994 | Pollock | ................ A01K 5/0258 119/57.4 |
| 9,826,776 B1 | 11/2017 | Sinclair, Jr. | |
| 10,039,314 B2 | 8/2018 | Greene | |
| 10,440,984 B1 | 10/2019 | Richmond et al. | |
| 2009/0288666 A1 | 11/2009 | Patel | |
| 2010/0269839 A1 | 10/2010 | Kaljura et al. | |
| 2011/0303230 A1 | 12/2011 | Thiry | |
| 2012/0298684 A1 | 11/2012 | Laplante | |
| 2013/0047996 A1 * | 2/2013 | Ryszard | ................... A24C 5/06 131/70 |
| 2013/0228187 A1 | 9/2013 | Yisha | |
| 2014/0195032 A1 | 7/2014 | Horn et al. | |
| 2016/0029691 A1 | 2/2016 | Ruzycky | |
| 2017/0188623 A1 | 7/2017 | Cranford | |
| 2019/0037911 A1 | 2/2019 | Wagner | |

OTHER PUBLICATIONS

Mamooji, Automated Joint Rolling Cell, Aug. 13, 2018 [online] retrieved from < URL: https://www.youtube.com/watch?v=XdFAyKs29Cw >.

Hefestus Technologies Ltd, Hefestus Cone Rolling Robot, Nov. 7, 2018 [online] retrieved from < URL: https://www.youtube.com/watch?v=zPQKkSlfcBU >.

International Search Report, PCT/US19/49093, dated Nov. 20, 2019 (3 pages).

Written Opinion of the International Search Authority, dated Nov. 20, 2019 (8 pages).

* cited by examiner

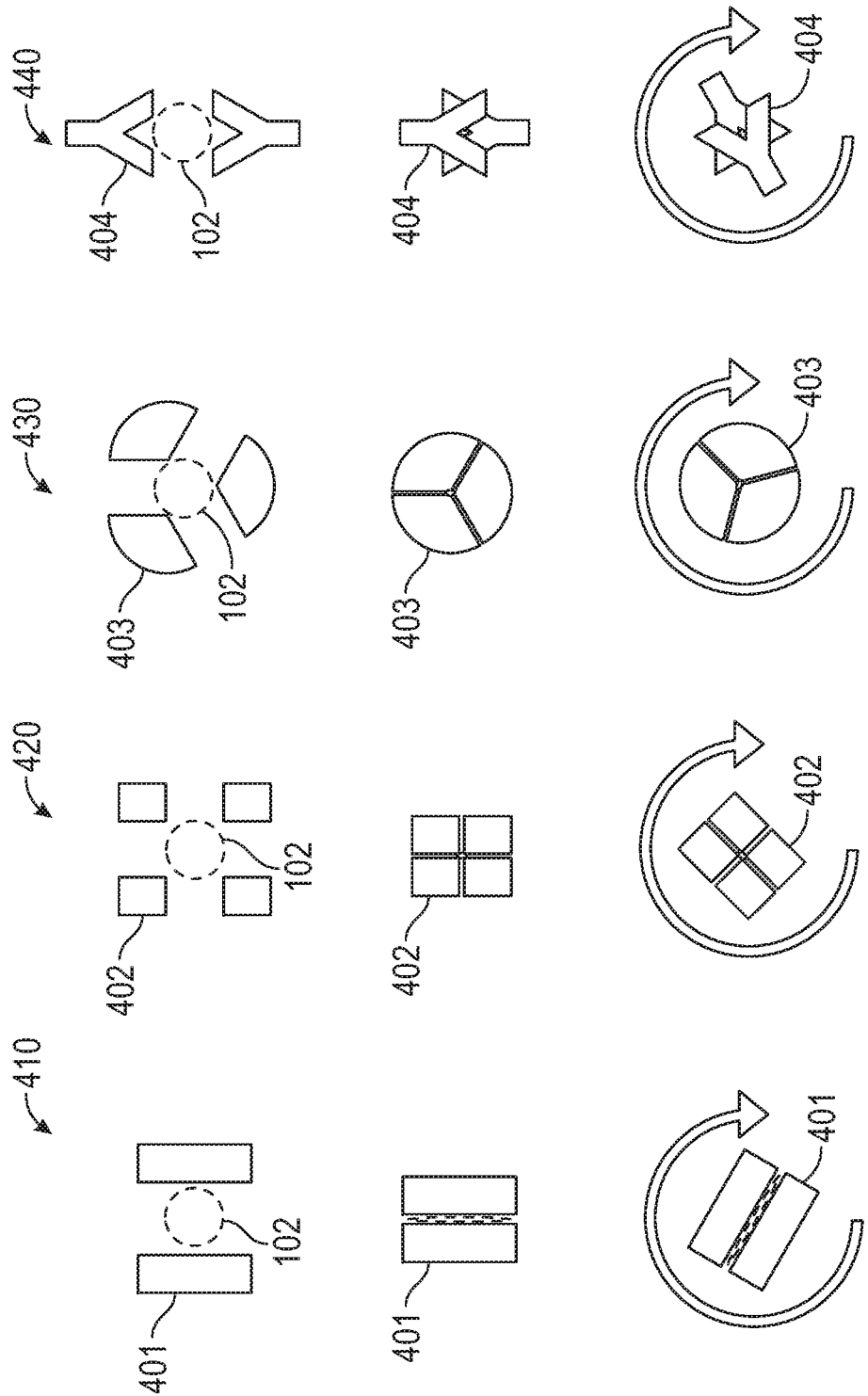

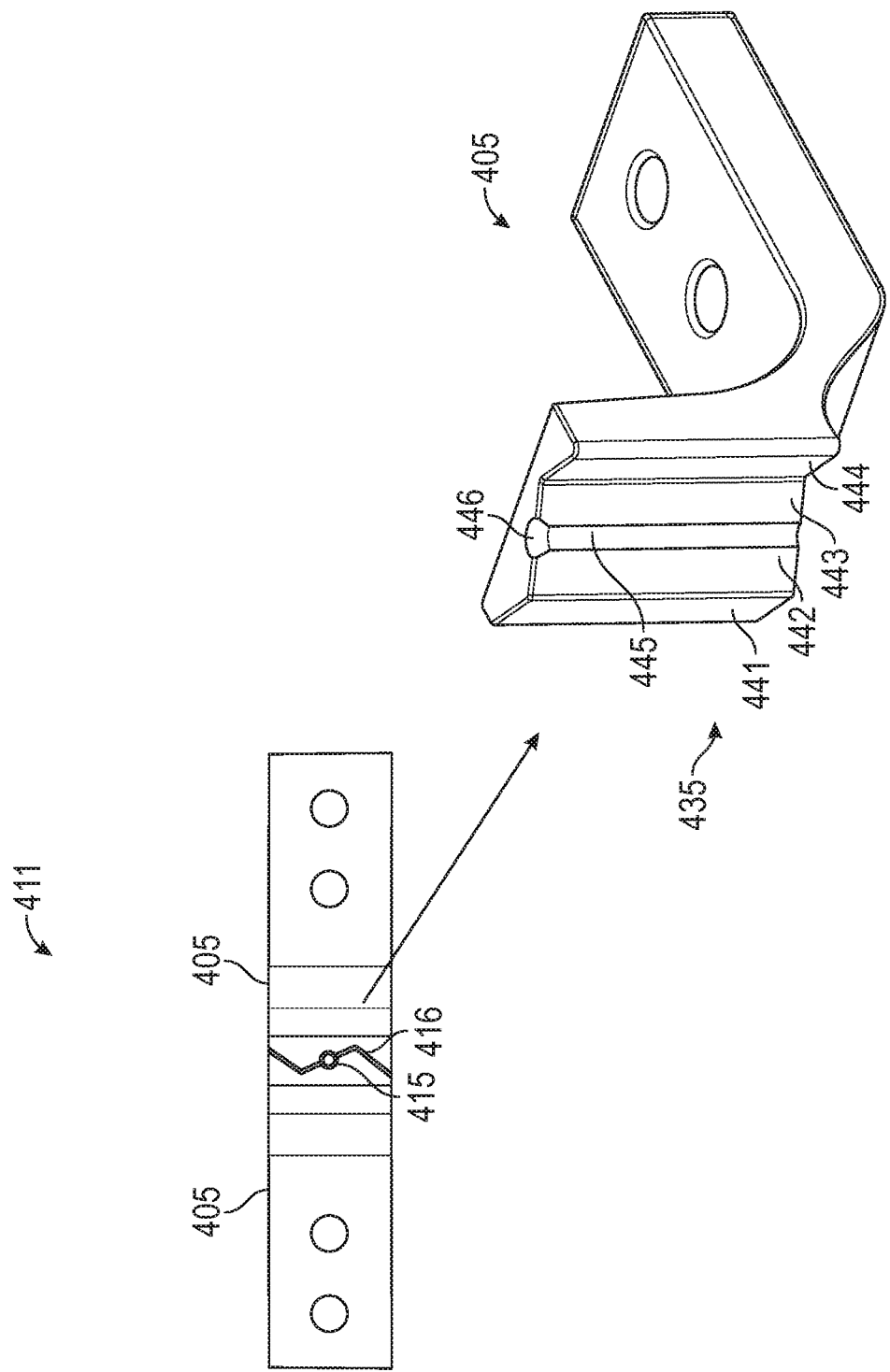

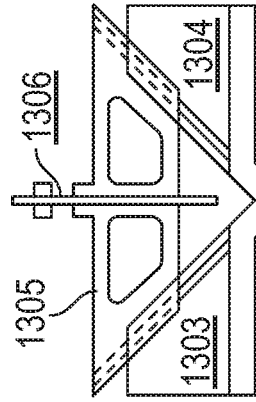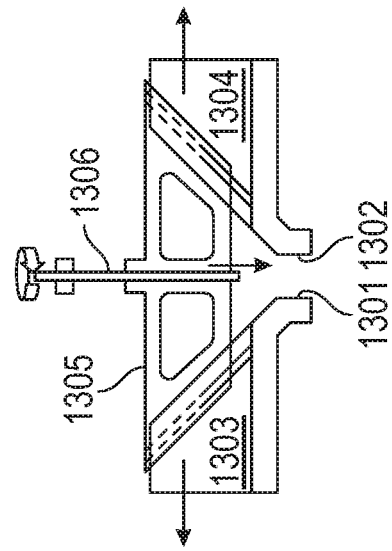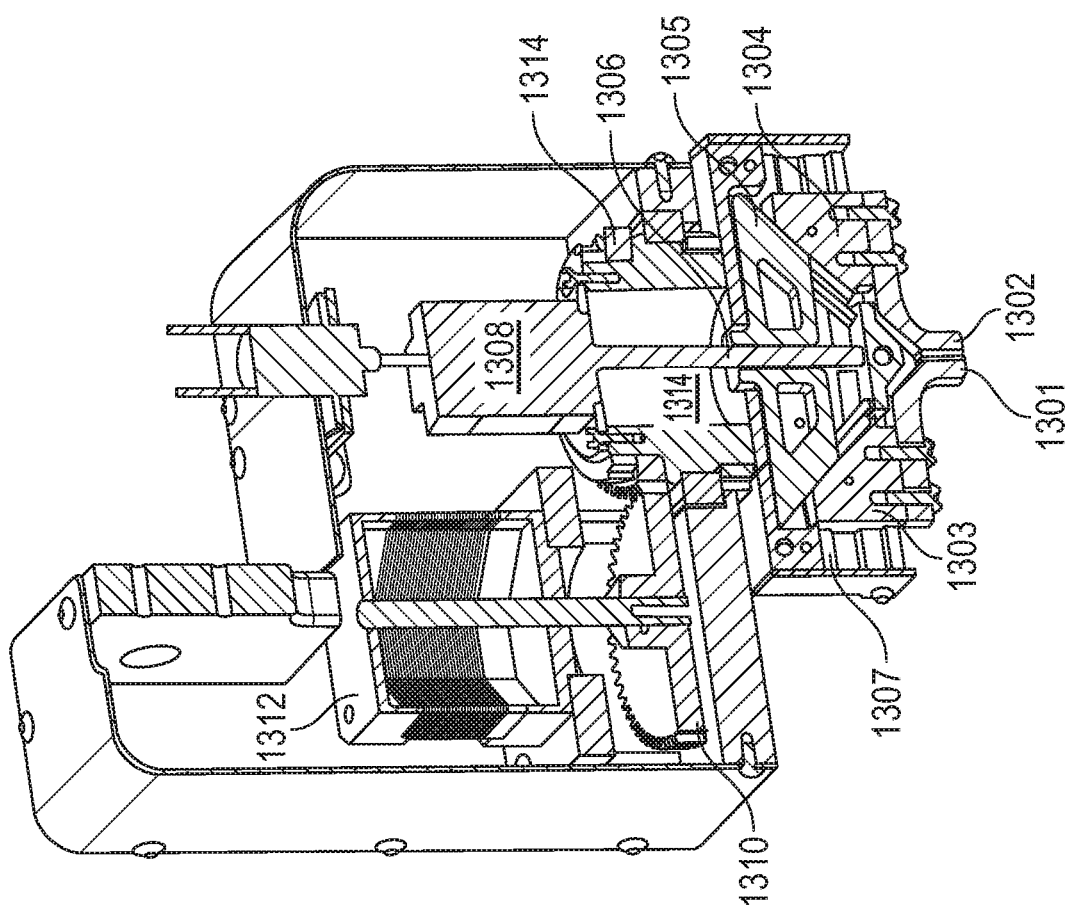

SYSTEMS AND METHODS FOR AUTOMATED PRODUCTION OF CIGARETTES

CROSS-REFERENCE TO RELATED APPLICATIONS

This application claims priority to Provisional Patent Application No. 62/724,955, filed Aug. 30, 2018, the entire contents of which are hereby incorporated by reference.

TECHNICAL FIELD

The present invention relates, generally, to the automated preparation and rolling of cigarettes and, more particularly, to the simultaneous pinching and twisting of an open end of each cigarette.

BACKGROUND

Recent years have seen a dramatic increase in the use of cannabis for both medical and recreational purposes. Nevertheless, even in jurisdictions where cannabis has to some extent been legalized, the cultivation, testing, distribution, and consumption of cannabis products remain highly regulated.

Cannabis may be consumed in a variety of non-inhalable forms, such as tinctures, ingestible oils, and infused food products, but inhalable products such as cannabis cigarettes remain widely popular. Currently known methods for large-scale production of cannabis cigarettes are unsatisfactory in a number of respects, however. For example, known cigarette rolling machines require a significant amount of operator interaction, particularly with respect to handing the raw material, loading rolling papers, addressing filling inconsistencies, and the like. Furthermore, the inherent tackiness or stickiness of some material (such as cannabis) makes it difficult to dispense the material in a robust and continuous fashion due to clumping or "bridging" of the material during operation.

In addition, presently known systems lack the ability to replicate the look and feel of hand rolled cigarettes, particularly with regard to the familiar twisted end popularized in the 1960's. Furthermore, such systems are unable to track the raw material (e.g., cannabis material) and associate that material with individual cigarettes produced during the process.

Systems and methods are therefore needed that overcome these and other limitations of the prior art.

SUMMARY OF THE INVENTION

Various embodiments of the present invention relate to systems and methods for, inter alia: i) preparing, within an enclosed and automated system, finished tobacco, cannabis, and other cigarettes from pre-rolled cones and dried raw (e.g., cannabis) product; ii) feeding dry shake material into cones in a precise manner using an auger assembly with integrated follower gears and pins; iii) preventing clogs during dispensing of dry shake material using the intermittent injection of pressurized air; iv) grinding and collecting raw cannabis material to produce cannabis shake for metered dispensing within pre-rolled cones; v) tamping pre-rolled cones upon determining that the pre-rolled cones contain a predetermined amount of cannabis shake material; vi) simultaneously pinching and twisting a free end of the filled cigarette; vii) tracking and accounting for cannabis material by mapping input cannabis material to finished cannabis cigarettes using indicia printed on the pre-rolled cones; and viii) an automated subsystem configured to seal the open end of a pre-rolled cone using an anvil component having a threaded central bore configured to receive a motor-driven threaded rod, and first and second side blocks slideably engaging the anvil component and having pinching fingers rigidly coupled thereto.

Various other embodiments, aspects, and features are described in greater detail below.

BRIEF DESCRIPTION OF THE DRAWING FIGURES

The present invention will hereinafter be described in conjunction with the appended drawing figures, wherein like numerals denote like elements, and:

Figure 1:
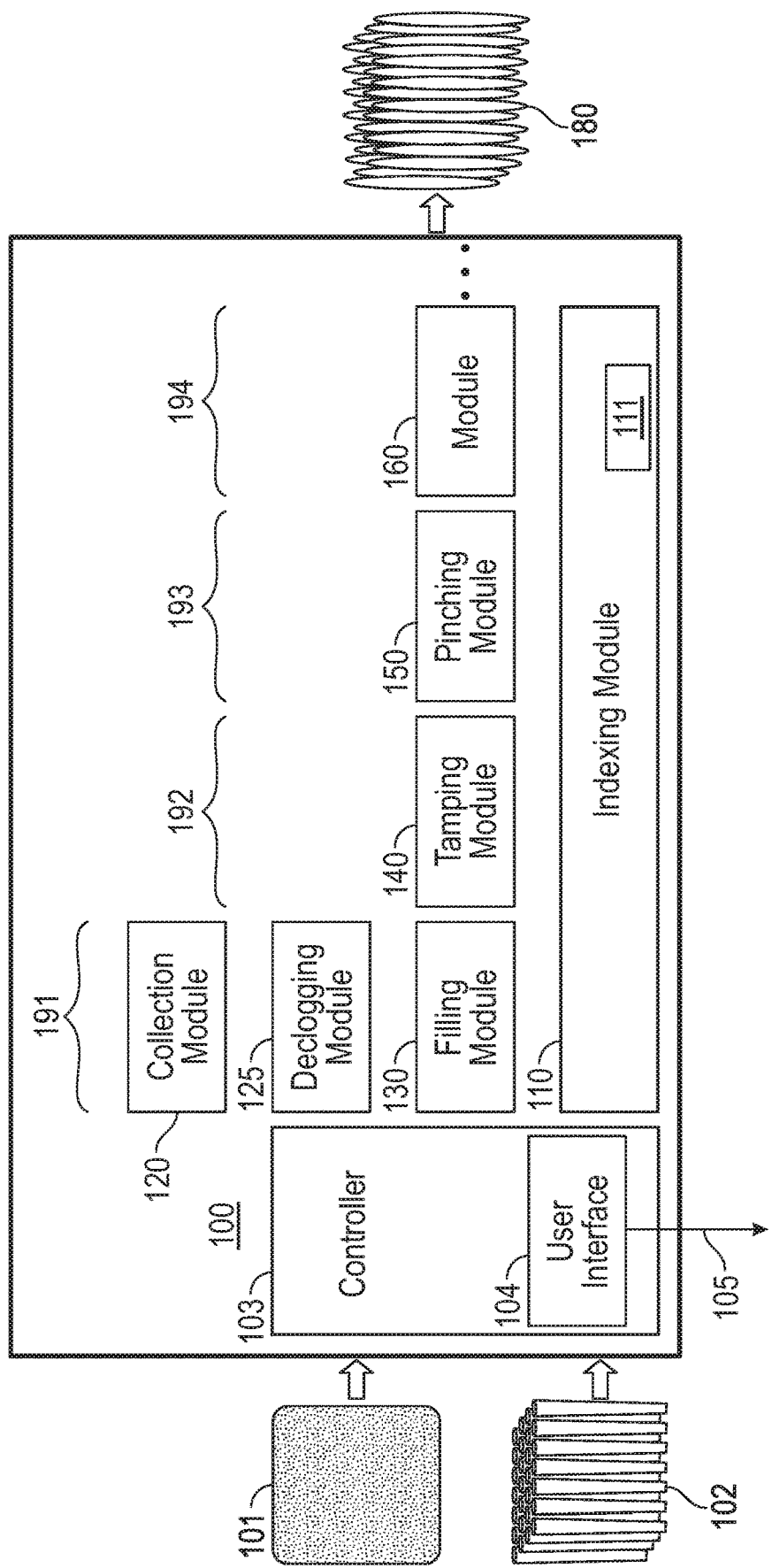
FIG. 1 is a conceptual block diagram of an automated cigarette production system in accordance with various embodiments.
Figure 5B:
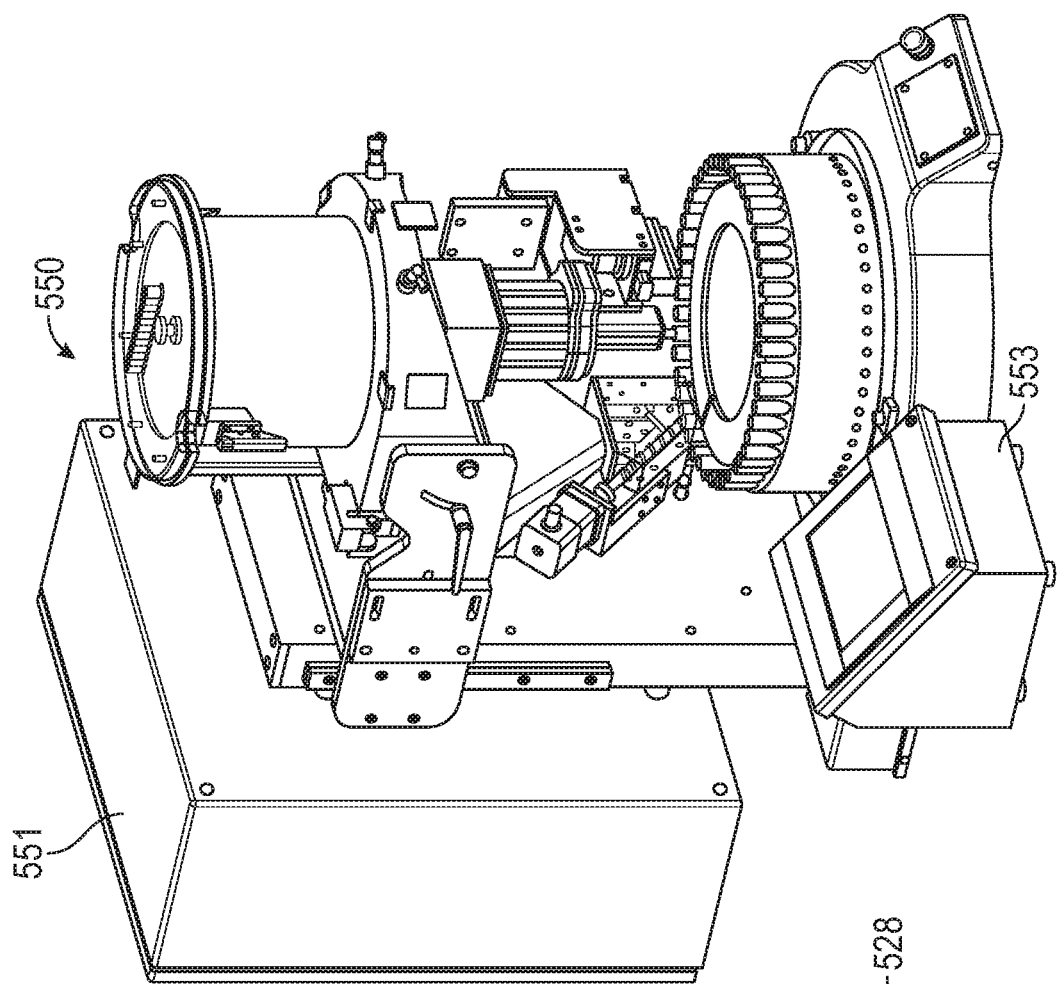
Figure 5A:
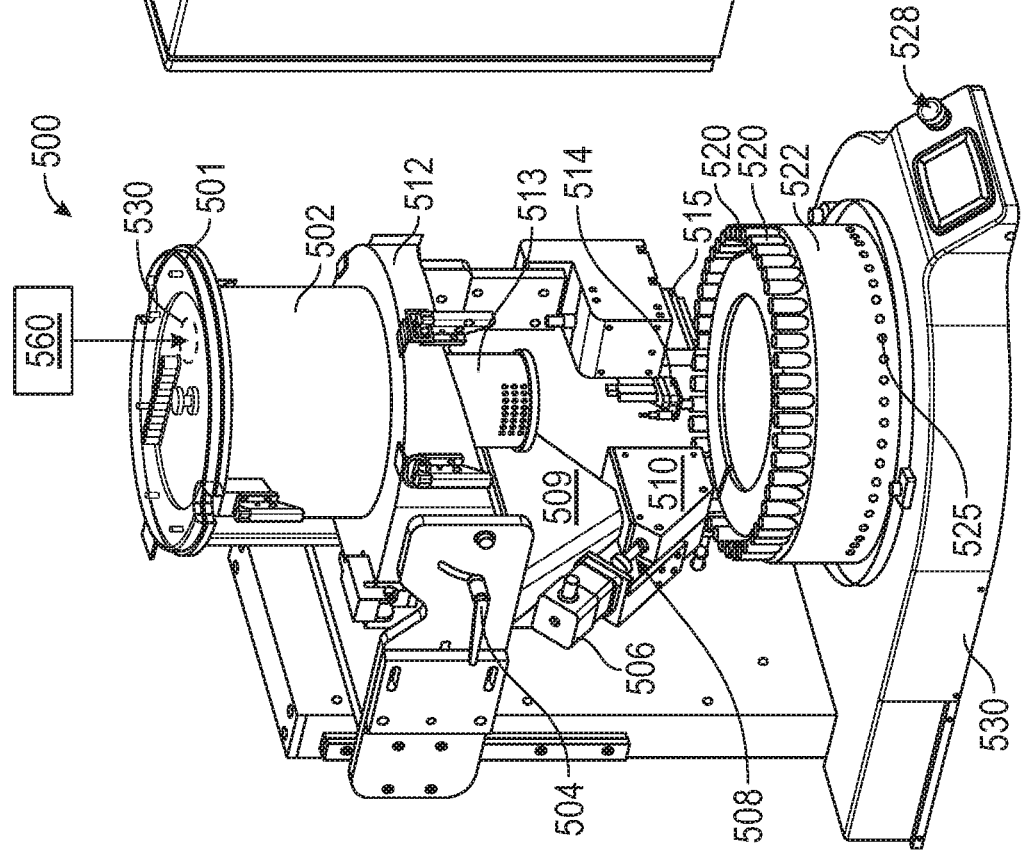
Figure 6:
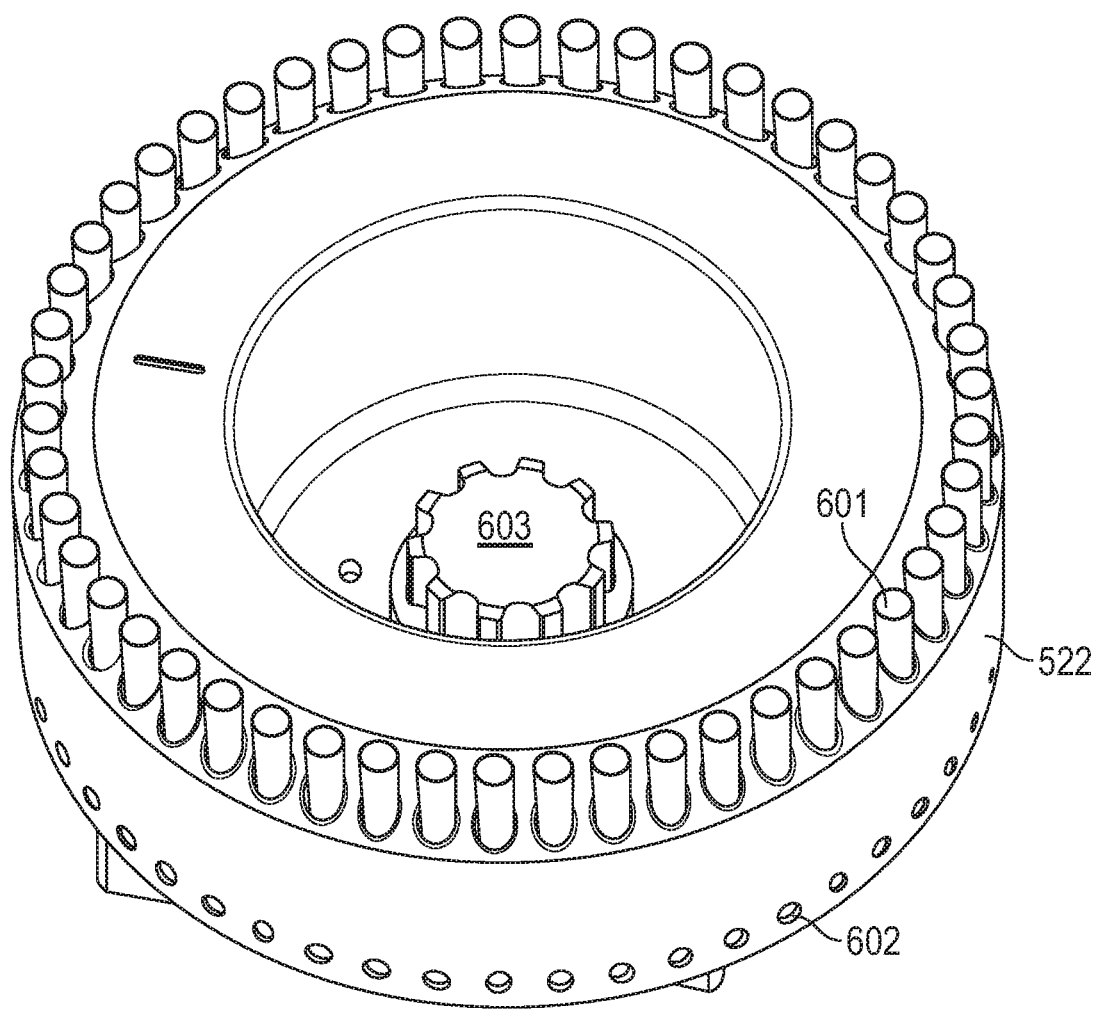
Figure 7C:
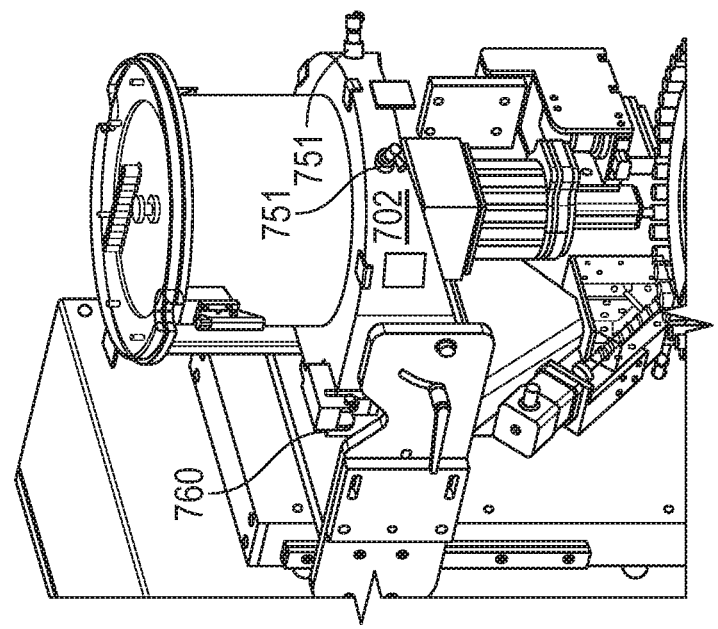
Figure 7B:
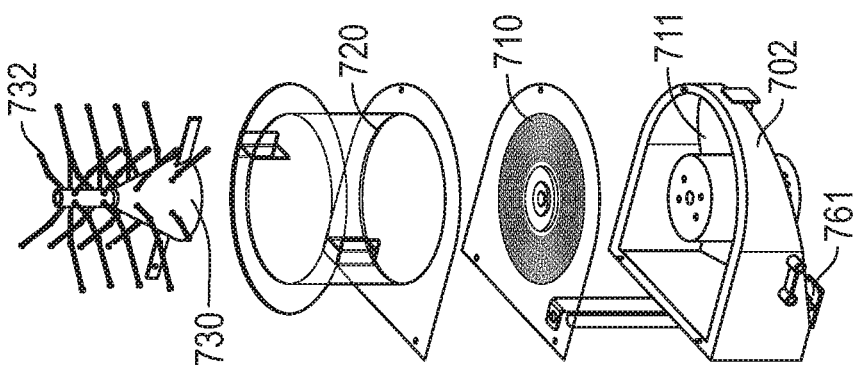
Figure 7A:
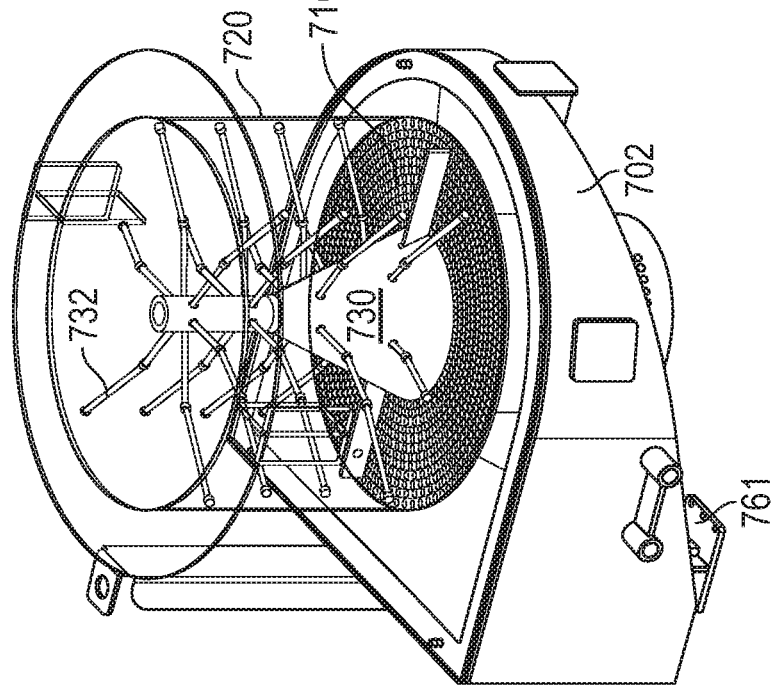
Figure 9:
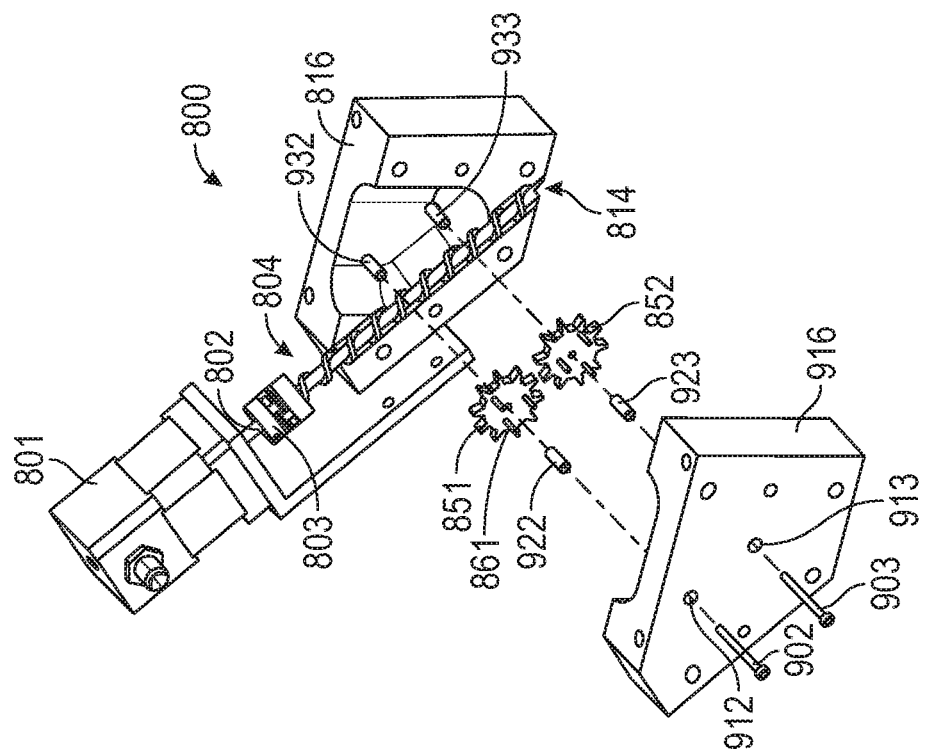
Figure 8A:
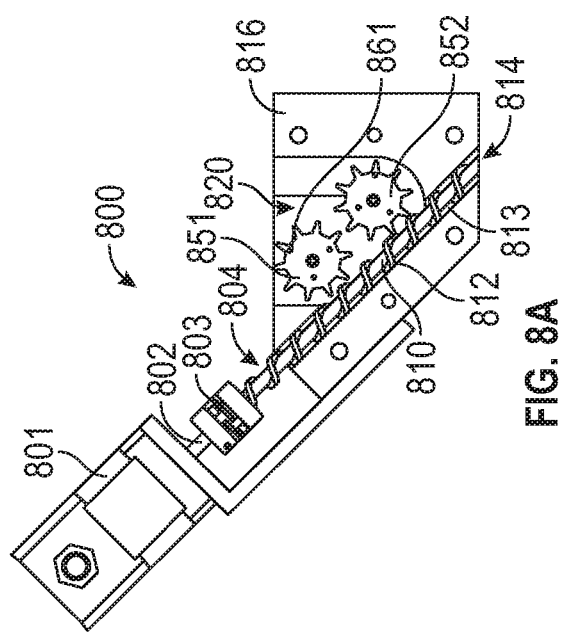
Figure 8B:
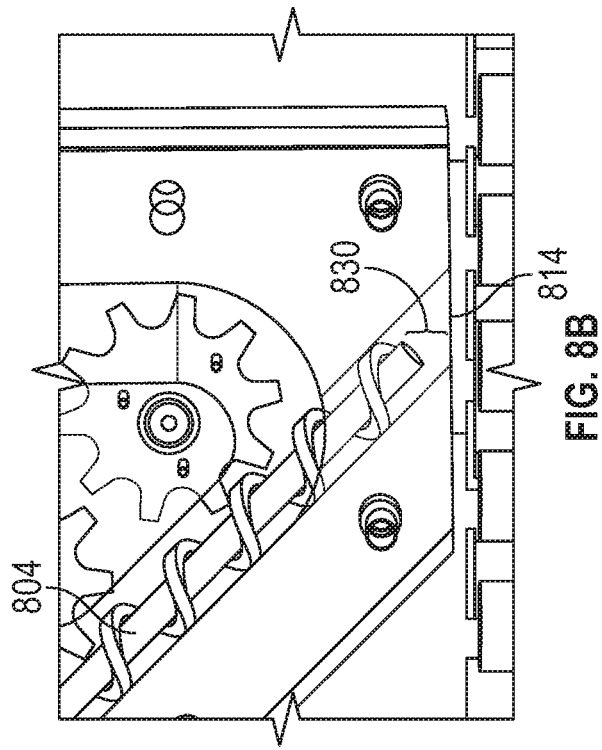
Figure 10:
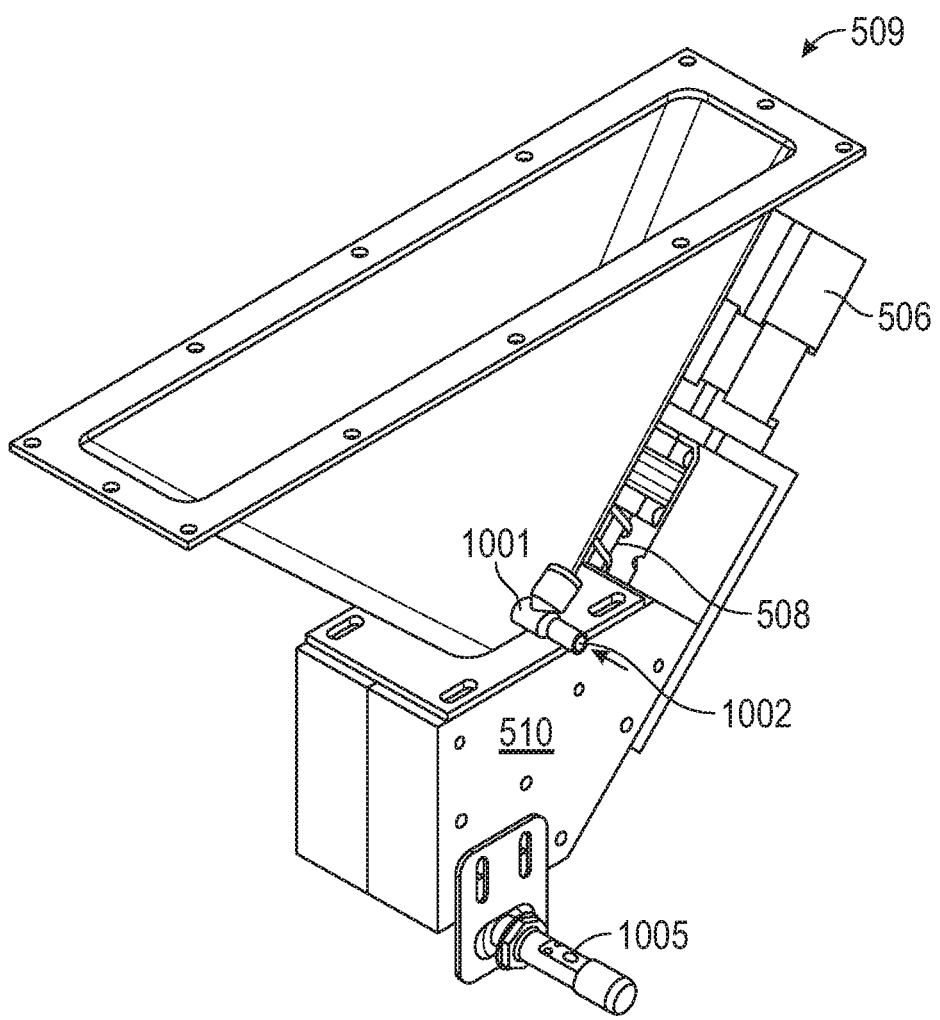
Figure 11:
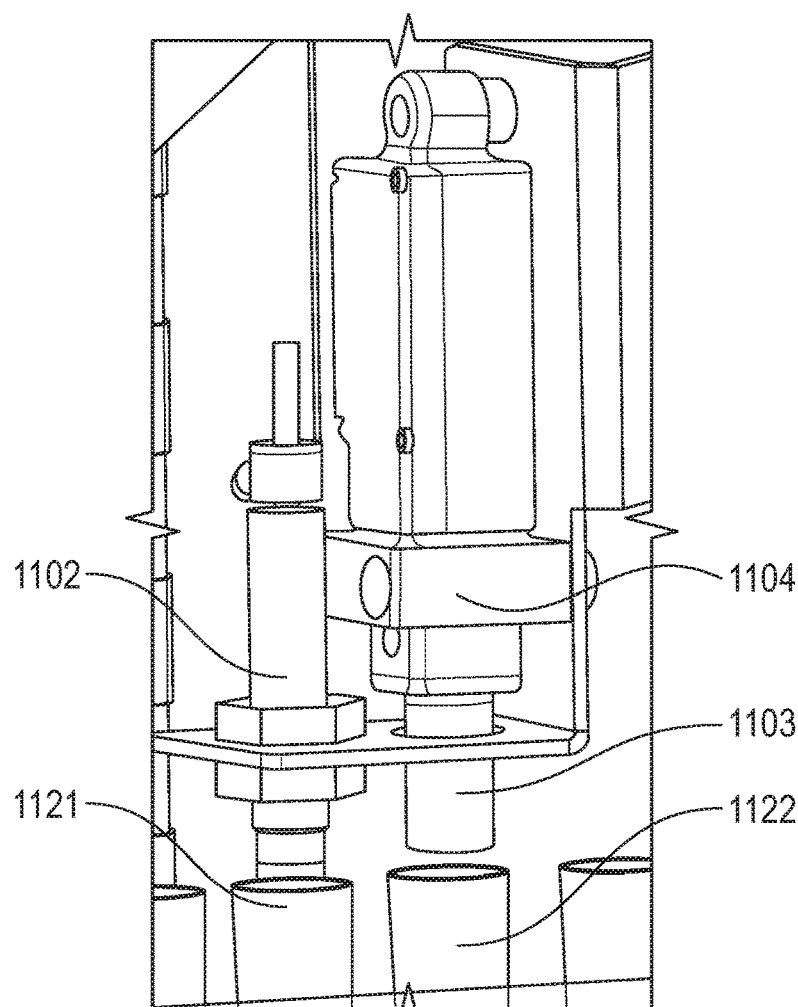
Figure 12:
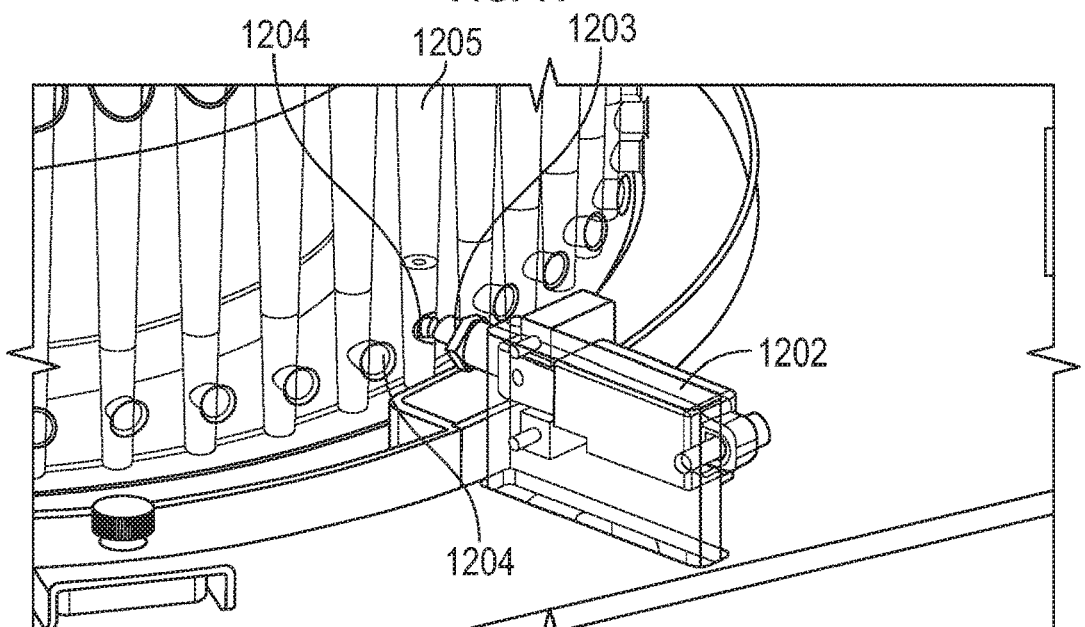
Figure 15:
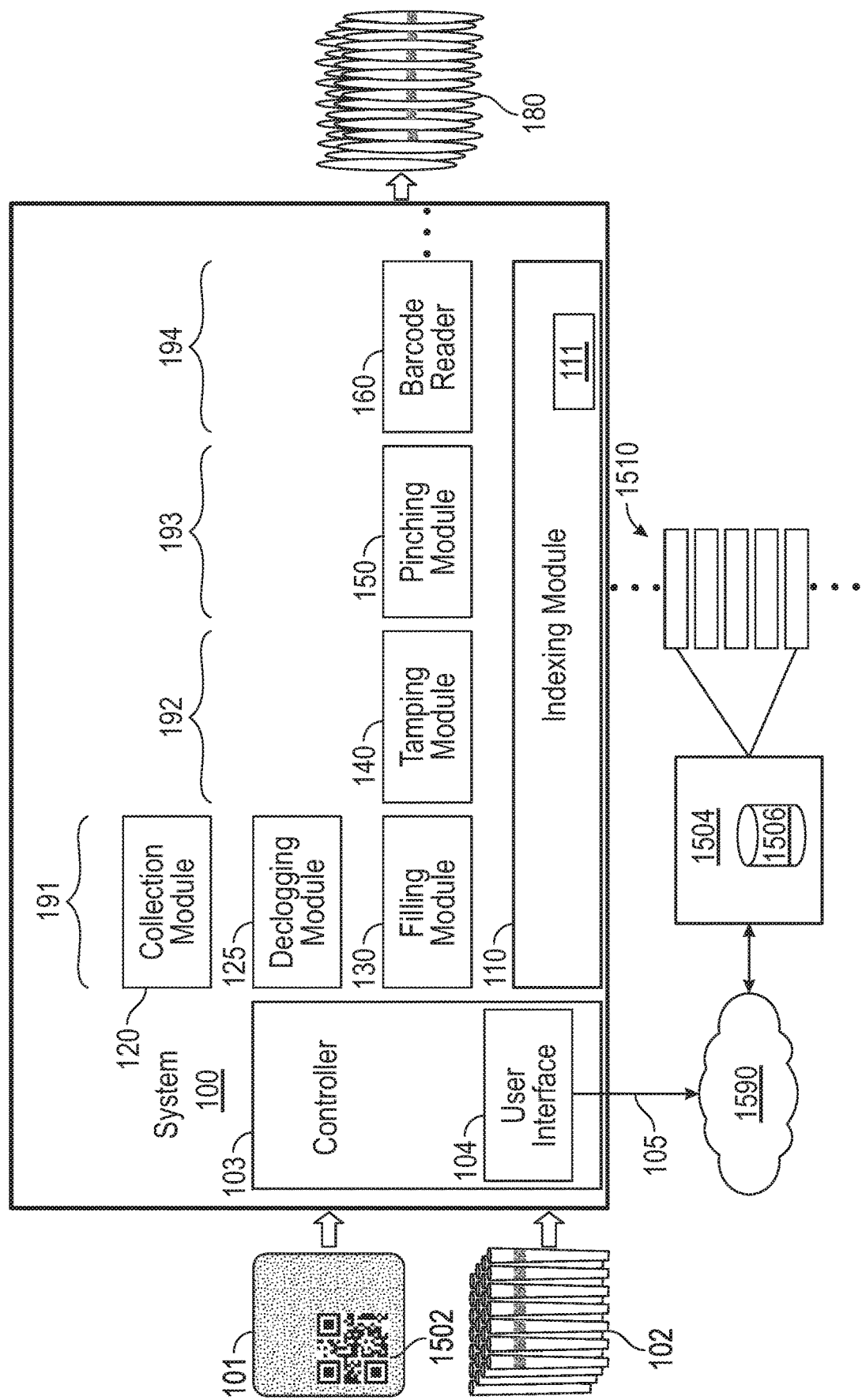

FIGS. 4A-4E present examples of gripper finger configurations in accordance with various embodiments;

FIGS. 5A and 5B illustrates an automated cigarette production system in accordance with one embodiment;

FIG. 6 illustrates a carousel for holding multiple empty cones in accordance with the automated cigarette production system of FIG. 5;

FIGS. 7A, 7B, and 7C are isometric and exploded views of a grinding/collection module in accordance with various embodiments;

FIGS. 8A and 8B are partial cut-away views of a feeder mechanism and auger assembly in accordance with various embodiments;

FIG. 9 is an exploded view of the feeder mechanism and auger assembly of FIG. 8;

FIG. 10 is an isometric view of a feeder mechanism and associated funneling component;

FIG. 11 is an side view of a tamping module in accordance with various embodiments;

FIG. 12 is an isometric view of a cone stabilizing component in accordance with one embodiment;

FIG. 13 is a partial cut-away view illustrating a pinching module in accordance with one embodiment;

FIGS. 14A-14B illustrated, conceptually, operation of the pinching module of FIG. 13; and FIG. 15 is a conceptual block diagram of the automated system of FIG. 1 with additional components configured to track raw material to finished cigarettes using a bar code system.

FIGS. 16-23 present various display screens associated with a user interface in accordance with various embodiments.

DETAILED DESCRIPTION OF PREFERRED EXEMPLARY EMBODIMENTS

Various embodiments of the present invention relate to improved systems and methods for the automated production of rolled cigarettes, such as cannabis cigarettes. In that regard, the following detailed description is merely exemplary in nature and is not intended to limit the inventions or the application and uses of the inventions described herein.

Furthermore, there is no intention to be bound by any theory presented in the preceding background or the following detailed description.

FIG. 1 is a conceptual block diagram of an automated cigarette production system in accordance with various embodiments. In general, cigarette production system (or simply "system") 100 is configured to take, as inputs, raw material 101 (e.g., dry marijuana material or tobacco) as well as a set of empty pre-rolled cones 102 (e.g., paper or hemp cones) and produce as an output a set of completed, ready-to-smoke rolled cigarettes 180.

In the illustrated embodiment, system 100 generally includes a controller 103 and associated user interface 104 configured to control the various modules contained within system 100, including indexing module 110 (and any associated motors 111), collection module 120, de-clogging module 125, filling module 130, tamping module 140, pinching module 150, and any other additional modules 160 (e.g. bar-code reading modules, material weighing modules, and the like).

The various modules may, as described in further detail below, be arranged in a sequence of "stations" through which the cones 102 pass (and stop temporarily) during processing. For example, as shown in FIG. 1, collection module 120 and filling module 130 may correspond to a station 191, tamping module 140 might correspond to a station 192, a station 193 might correspond to a pinching module 150, and one or more other modules (such as a barcode reader module or the like) may correspond to a station 194. Controller 103 may include various additional interfaces (e.g., 105) for communicating with external systems, such as network components, databases, servers, and the like.

Raw material 101 may include any dry or substantially dry material of the type configured to be processed and packaged in a cigarette form. In one embodiment, for example, the raw material comprises cannabis in one or more forms, such as seeds, buds, leaves, and the like. In that regard, raw material 101 may be packaged in a variety of ways and may be characterized by a variety of attributes, such as weight, percentages of various components (e.g., flowers, leaves, etc.).

Pre-rolled cones 102 may include any conical or tubular structure (or other structure having one sealed end and one open end) manufactured from paper, hemp, or the like for holding raw material 101 during processing by system 100. Cones 102 may be provided in a variety of lengths, such as 83 mm, 98 mm, 110 mm, 180 mm, or 280 mm.

While described in further detail below, collection module 120 is generally configured to prepare raw material 101 such that it can be dispensed into individual cones 102, and toward this end may include a grinder or the like for further processing raw material 101. Collection module will generally also include a hopper for storing the prepared dry material.

De-clogging module includes any component or set of components configured to prevent or mitigate the build-up or clumping of raw material and thereby avoid clogging the collection module 120 and/or filling module 130. As described in further detail below, de-clogging module may include a pressurized air source and associated couplings configured to intermittently inject pressurized air into collection module 120 (e.g., the "hopper") and/or filling module 130 to effectively dislodge any dry product that might aggregate together or otherwise impede the dispensing of material via filling module 130. In other embodiments, a shaker or vibration source is mechanically coupled to collection module 120 and/or filling module 130 to break apart any such clumps of dry material. In some embodiments, the hopper or related components are chilled relative to room temperature in order to counteract the inherent stickiness or tackiness of the material.

Filling module 130 is generally configured to serially dispense, in a controlled and metered fashion (as commanded by controller 103), the prepared dry material (i.e., "cannabis shake") into respective cones 102. Tamping module 140 is generally configured to compress or "tamp down" the prepared dry material within each filled cone 102. Finally, pinching module 150 is configured to pinch-twist the open ends of cones 102 to form the finished rolled cigarettes 180.

In accordance with some embodiments, cones 102 are pre-processed prior to or during filling to enhance certain desirable characteristics of the finished cigarette. For example, a layer of kief (fine, crystalline dust), wax, oil, or other marijuana concentrate may be dispensed to form a thin layer on the inner surface of each cone.

Indexing module 110 is configured to move the cones 102 from station to station (e.g., sequentially through stations 191 to 194) to accomplish the above steps in sequence, preferably under the control of controller 103. A suitable user interface 104 is provided to allow an operator to initially calibrate and/or dynamically configure various parameters of the automated process. That is, as detailed below, in one embodiment the raw material 101 and cones 102 are simply loaded within system 100 (which is enclosed and self-contained), and the automated process (initiated via user interface 104) continues until all of the cones 102 have been prepared as finished rolled cigarettes 180.

In accordance with various embodiments, an array of sensors is provided to determine the state of selected system parameters with high precision. Such sensors may be configured, for example, to identify and report the position of the rotary table, the state of the feed mechanism, the state of the twisting, tamping, and fill sensor systems, and other such state information. A homing sensor allows the machine to determine, for example, the position of the rotary table and to continue filling at that location without requiring the operator to restart the fill sequence from the beginning. In accordance with one embodiment, the fill sensor allows the system to compensate for variations in fill speed, which will generally be a function of the physical characteristics of the dry material itself.

Figure 2:
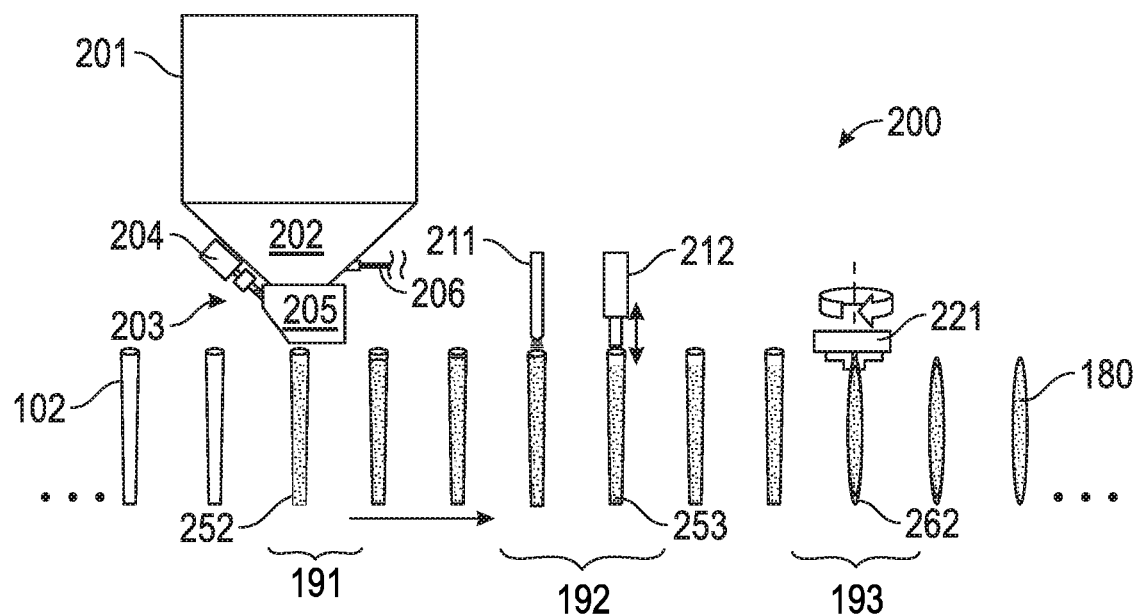
FIG. 2 is a diagrammatic illustration of the components of an automated cigarette production system in accordance with various embodiments.

Referring now to the conceptual illustration shown in FIG. 2 in conjunction with the block diagram of FIG. 1, the components of an automated cigarette production system 200 and method will now be described.

In general, empty cones 102 having a closed "bottom" end and open "top" end as illustrated move through the process from left to right as shown. The collection module 120 of FIG. 1 is implemented as a grinder 201 and bottom hopper 202, wherein grinder 201 is configured to convert bulk raw material 101 into more granular "shake" material for subsequent dispensing by the generally funnel-shaped hopper 202.

Filling module 130 may be implemented as a feeder system 203 configured to dispense the shake material using, for example, an auger subassembly 204 and associated dispenser block 205, into empty cones 102 to yield cones 252 filled with a predetermined quantity of un-tamped shake material. Pressurized air may be intermittently injected (via inlet 206) into hopper 202 (e.g., near the bottom) to thereby unsettle, disaggregate, or otherwise "de-clog" any dry material that has accumulated therein.

Tamping module 140 is implemented in this embodiment as two subsystems: a fill sensor 211 (e.g., an optical, capacitive, volume, or mass sensor) configured to determine whether a particular cone 102 has been sufficiently filled with prepared material, and a tamping component 212 configured (e.g., via a linear actuator) to compress the prepared material to form a packed cone 253. As shown, fill sensor 211 may be positioned adjacent to (i.e., prior in sequence to) tamping component 212 such that tamping component 212 will only be actuated for cones that have been filled to some predetermined height or volume. In another embodiment, the fill sensor 211 (e.g., a capacitive sensor) is positioned orthogonal to cones 252 at the point of dispensing (e.g., adjacent to dispenser block 205) to thereby determine the fill level of each cone.

Figure 3:
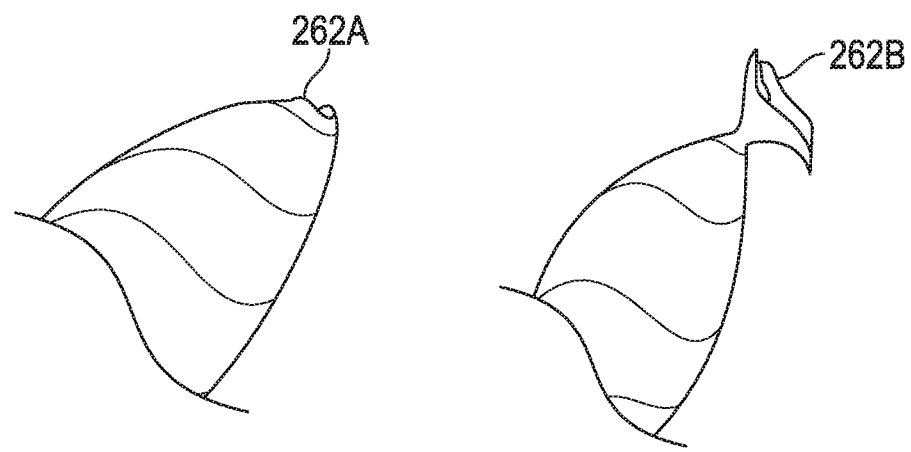
FIG. 3 illustrates various pinch-twisted cigarette ends in accordance with example embodiments.

Pinching module 150 is implemented, in the illustrated embodiment, as a pinch-twist system 221 configured to pinch close the open (top) ends of cones 102, and then subsequently (or simultaneously) rotate by a predetermined amount (e.g., 360-1080 degrees) to effectively seal the open end and form the finished closed cigarette 262. In this regard, FIG. 3 illustrates various pinch-twisted cigarette ends in accordance with example embodiments, including, for example, a tightly coiled end 262A and a larger, flower-like end 262B. The particular end geometry will generally be a function of many factors, such as the number of rotations provided by pinch-twist system 221 and the geometry of the end-effector or gripper fingers used by system 221.

FIGS. 4A-4D present examples of gripper finger configurations in accordance with various embodiments. It will be understood that these are provided merely as examples, are not intended to be limiting, and are not necessarily drawn to scale. Each of the figures shows, from top to bottom, the gripper fingers in their open position (relative to a cone-top 102), the gripper fingers in their substantially closed position, and the gripper fingers undergoing rotation. More particularly, FIG. 4A illustrates a gripping arrangement 410 including a pair of planar fingers 401; FIG. 4B illustrates a gripping arrangement 420 including four rectangular fingers 402 (in which their vertices meet in the center when closed); FIG. 4C illustrates a gripping arrangement 430 including three fingers 403; and FIG. 4D illustrates a gripping arrangement 440 including a pair of "Y"-shaped fingers 404 that can overlap or otherwise interlock as shown.

FIG. 4E illustrates (in both top and inverted isometric views) an alternate gripper arrangement 411 including two matching gripper fingers 405 that contact each other (when closed) in a zig-zag pattern 416 having a central, circular cavity 415. The face 435 of each finger 405 is characterized by three substantially planar regions that are parallel to the rotational axis of the assembly 411: a first plane (441), a second plane (442, 443), and a third plane 444. A central semi-cylindrical region 445 separates the two halves (442, 443) of the second plane, and corresponds to hole 415 in the top-down view. The central cavity 445 ends in a conical or flared opening 446. This zig-zag configuration has been found to pull the material inward and the circular central cavity provides clearance for the twist to form.

While FIGS. 4A-4D illustrate rotation occurring after the respective gripper fingers have fully closed, the invention is not so limited. The gripper fingers may close and/or open gradually during rotation. That is, referring to FIG. 4B for example, the rate at which fingers 402 move radially inward and outward, and the rate at which rotation occurs (and the time at which each of those actions start and end) are fully controllable and configurable via controller 103 and user interface 104.

In some embodiments, the pinch and twist action occurs in one continuous step. In other embodiments, the end of the cone is pinched, then allowed to relax before performing the final pinch and twist action. In one embodiment, for example the procedure includes: (1) closing the gripper on the paper; (2) applying two to three turns; (3) opening the gripper and allowing the twist to relax; (4) closing the gripper again; and (5) applying another 5 to 6 turns.

The various gripper fingers illustrated above may incorporate a variety of materials, including polymeric, rubber, or other compliant materials on their gripping surfaces. In some embodiments, a food-safe material is used, such as food-grade plastic, polyoxymethylene (e.g., Delrin), stainless steel, or the like.

FIG. 5A illustrates an automated cigarette production system 500 in accordance with one embodiment, the various components of which will be separately described in detail below. While not illustrated in FIG. 5, it will be understood that the moving parts of system 500 may be partially or wholly enclosed or shrouded, for example by a pair of transparent doors that articulate relative to base 530 such that the internal components are visible through clear side panels but are otherwise safely isolated to avoid inadvertent contact by an operator.

With continued reference to FIG. 5A, system 500 generally includes a grinder mechanism 502 having a selectably lockable grinder lid 501, a hopper 512, a grinding motor 513, feed motor 506, auger assembly (or simply "auger") 508, funneling component 509, feed mechanism 510, tamping mechanism 514, twisting mechanism 515, lockable pivot joint 504 (allowing rotation of hopper 512 and grinder 502 to facilitate loading) and carousel 522 for holding cones 520 in an upright position. Carousel 522 also includes a set of peripheral openings 525 that allow a cone stabilizing component to be inserted, as described in further detail below.

In some embodiments, grinder lid 501 is provided within an opening or aperture 530 (e.g., a 2-inch round opening) that allows raw material to be continuously provided (e.g., by a material handler, illustrated conceptually by block 560) to grinder 502, removing the necessity for manually filling grinder 502 when its supply has been depleted. Furthermore, in some embodiments multiple systems 500 are configured to operate simultaneously and in parallel, receiving a supply of raw material from a common material handler 560.

It will be appreciated that the user interface and controller components may be configured in a variety of ways, and that the overall footprint and form factor of system 500 may vary. FIG. 5B, for example, shows an alternate embodiment of a system 550 that includes a separate (not physically integrated) human-machine-interface module 553, which may be coupled to the functional components of system 550 through either a wired or wireless connection. System 550 further includes an enhanced control panel enclosure 551 and associated control system components coupled to a back portion of system 550, as shown.

FIG. 6 is an isometric overview of carousel (or rotary table) 522, which includes a series of peripheral conical cups 601 configured to hold the cones 102 in place as they move through the various stations of the system. Cups 601 are of sufficient height (relative to the cones 102) that they hold the cones in place, but are not so large that they interfere with any other subsystem, such as the pinch-twist subsystem described below. In one embodiment, cups 601 are approximately ¾ the height of the cones that are being used.

Carousel 522 is preferably mechanically coupled to a motor (not illustrated) via a lock nut 603 that can be hand-manipulated, thereby allowing different carousels 522 to be easily removed and inserted. Carousel 522 also includes a series of openings corresponding to respective cups 601 which allow physical access to a bottom portion of each cone when they are placed in their respective cups. Such physical access allows, for example, a selectively extendable and retractable cone stabilizer (illustrated in FIG. 12) to hold the cone in place during pinch-twisting (as described in detail below). Openings 602 also allow visual inspection of the cones, for example, to allow bar-codes printed on the exterior of the cones to be viewed by a bar code reader.

While FIG. 6 illustrates a single circular carousel, the invention is not so limited. In one embodiment, a robotic component is configured to automatically change out carousels, and is used in connection with a system that fills each carousel with cones and removes the finished cigarettes after processing. In a further embodiment, the cones are presented in a continuous, linear sequence, so that there is no requirement for changing out individual carousels (e.g., as illustrated in FIG. 2).

FIGS. 7A and 7B are isometric and exploded views, respectively, of a grinding/collection module in accordance with the automated cigarette production system of FIG. 5. In general, the grinding portion includes an upper container 720 configured to house a rotating grinding cone 730 having a number of radial tines 732 extending therefrom. Grinding cone 730 is suitable coupled via a shaft to a motor (not illustrated). Also illustrated is a screen 710 and a hopper 702. Hopper 702 has an inclined bottom surface 711 configured to channel the dry, prepared material (e.g., cannabis shake) that falls through screen 710 to a dispensing region 761.

In one embodiment, the configuration of tines 732 is selected based on one or more attributes of the raw material 101 as discussed above. That is, the number of tines, placement of tines, mechanical properties of the tines, etc. may be varied based on the nature of raw material 101. For example, multiple grinding cones 730 (with associated tine configurations) may be provided, each configured to be easily removed and replaced within the upper container 720 based on one or more attributes of raw material 101.

As shown in FIG. 7C, in one embodiment hopper 702 is provided with one or more inlet fixtures 751 or "air blow-off" fixtures that allow air or some other gas to be intermittently or constantly injected within the chamber of hopper 702.

In some embodiments, items 710, 720, and 730 are integrated into a single unit that can be removeably attached to hopper 702 and the associated motor. See, for example, FIG. 7C, which shows a latch 760 that can be actuated to remove the top portion of the system away from hopper 702. While not shown in the drawings, in such an embodiment the motor shaft may be configured to releasably engage the grinder cone 730 in an easy-to-use manner—e.g., through the use of a pair of mating, interlocking fixtures as seen in food blenders and the like.

In some embodiments, the dry material held within upper container 720 and/or hopper 702 is further enhanced to impart certain advantageous properties to the material. For example, a coolant module may be provided for cooling the dry material using, for example, a constant or intermittent supply of $CO_2$, $N_2$, or other cryogenic gas (injected, for example, through inlet fixtures 751). Such cooling reduces the effective "stickiness" of the dry material during processing.

FIGS. 8 and 9 illustrate, in partial cut-away and exploded views, a feeder mechanism 800 in accordance with one embodiment. In general, mechanism 800 includes a feeder motor 801 (e.g., a stepper motor having about 0.1 degree resolution) connected to a drive shaft 802 that is mechanically connected (via coupling mechanism 803) to an auger 804 and extends downward at approximately a 45-degree angle (relative to vertical). Auger 804 includes helical flighting 812 formed around shaft 810 such that auger 804 fits within an inner bore 813 of dispenser block 816. When auger 804 rotates (while driven by motor 801) the dry material that has been funneled into inner chamber 820 is driven downward toward opening 814 of block 816, which is positioned just above the open end of the unfilled cones. The tolerance between the outer diameter of auger 804 and the inner diameter of inner bore 813 is preferably small enough that there is no significant leakage of dry material along flighting 812.

While a variety of auger configurations may be used, in accordance with one embodiment the outer diameter (OD) of shaft 810 is between 0.450 and 0.495 cm (preferably 0.476 cm), the pitch of flighting 812 is between 1.325 and 1.375 cm (preferably 1.350 cm), and the strip width of flighting 812 is between 0.219 and 0.241 cm (preferably 0.228 cm). Thus, the outer diameter of flighting 812 is given by 2*strip width+shaft OD. In accordance with one embodiment, the inner diameter of bore 813 is approximately 0.980 cm, and the outer diameter of flighting 812 is approximately 0.933 cm.

In one embodiment, as shown in FIG. 8A, the distal end of auger 804 is substantially flush with the opening 814 of block 816. In other embodiments, as shown in FIG. 8B, the distal end of auger 804 is separated by a small distance 830 from opening 814 (e.g., about 1.0-10.0 mm from opening 814).

Also shown in FIGS. 8 and 9 are pair of follower gears (or "auger gears") 851 and 852 whose sprockets loosely engage with the flighting 812 of auger 804 such that gears 851 and 852 rotate in response to the rotation of auger 804, thereby agitating and preventing the clogging of material in and around auger flighting 812. In addition, as shown in FIG. 9, a set of pins 861 (e.g., three pins per gear) are provided at varying radii relative to the centers of each gear, and extend parallel to the rotational axis of the gears. These pins 861 further assist in breaking up any clumps of dry material within chamber 820.

In the illustrated embodiment, each gear 851, 852 rotates freely on respective axles 902 and 903, which are inserted through respective openings 912 and 913 of block 916 and are accepted within openings/spacers 932, 933 of block 816. A pair of spacers 922, 923 is provided to correctly position gears 851, 852 laterally such that the gears properly engage the flighting 812 of auger 804. The number of gears used and the dimensions of each gear may vary, but in one embodiment gears 851 and 852 are substantially the same, and are characterized by 10 sprockets, an outer diameter of 1.25 inches, a thickness of 0.125 inches, a sprocket depth of about 0.172 inches, and a sprocket opening angle of about 56 degrees.

In accordance with various embodiments, one or more coatings are applied to the inner surfaces of blocks 916 and 816 (and/or any other surface that is in contact with the dry material) to prevent sticking or "bridging" of the material during dispensing. In one embodiment, for example, an oleophobic and/or hydrophobic coating is applied to the internal components (e.g., outside surface of the auger and inside surface of the hopper).

FIG. 10 is an isometric view of a feeder mechanism and associated funneling component as seen from the back (i.e., relative to the overview shown in FIG. 5). More particularly, the funneling component 509 is shown with an inlet fixture or fitting 1001 having an inlet port 1002 for accepting pressurized air (or other inert gas) from, for example, an air-line leading from a compressor and regulator controlled via a solenoid or the like (e.g., via controller 103 of FIG. 1). In accordance with one embodiment, a brief (e.g., less than one second) puff of pressurized air is injected near the lower apex of funneling component 509 to thereby prevent the clogging of the material that has accumulated therein. In one embodiment, the air is injected for approximately 0.5-1.0 seconds at the beginning of each fill cycle (e.g., just prior to actuating the auger assembly).

Also shown in FIG. 10 is a sensor device 1005 (e.g., a capacitive sensor device) that is configured to determine whether an adjacent cone has been sufficiently filled with dry material.

FIG. 11 is a side view of a tamping module in accordance with various embodiments. As discussed above, the tamping module may include a fill sensor 1102 (e.g., a capacitive or optical sensor) configured to determine whether a cone 1121 contains a predetermined amount of dried material, along with a tamping device 1104 (e.g., a linear actuator) configured to selectively move a tamper 1103 vertically to suitably compress the prepared material in cone 1122. As shown, fill sensor 1102 and tamping device 1104 may be adjacent to each other (e.g., one index position apart). The invention is not so limited, however. In an embodiment, controller 103 monitors and records which cones at which positions contain a threshold quantity of prepared material. In one embodiment, tamper 1103 is pneumatically actuated, but might also be implemented as a solenoid or the like.

FIG. 12 is an isometric view of a cone stabilizing component in accordance with one embodiment. As shown, stabilizer 1202 includes a linear actuator (e.g., a pneumatically actuated component) for selectively causing end 1203 (which may be provided with a rubber or other tip configured to frictionally engage a cone) to enter the corresponding opening 1204 in cup 1205 and impinge upon the bottom of the cone residing in the cup (not shown in FIG. 12). The position and/or radial compression provided by stabilizer 1202 is preferably sufficient to prevent rotation of the cone during pinch-twisting but not so great that it causes deformation of the cone during the process.

FIG. 13 is a partial cut-away view illustrating a pinching module in accordance with one embodiment. An anvil 1305 is slideably coupled, via angled interlocking tracks, to opposing side blocks 1303 and 1304. Side blocks 1303 and 1304 are mechanically coupled to pinch fingers 1301 and 1302 to form an end effector as shown. A threaded rod 1306 is threadedly coupled to a central bore within anvil 1305, and is driven by a motor 1308 provided in the upper housing to actuate pinch fingers 1301 and 1302.

Anvil 1305, as well as side blocks 1303 and 1304, are contained within a lower housing 1307 that is configured to rotate relative to the upper housing. That is, lower housing 1307 is coupled to a gear 1314 that mates with a corresponding gear 1310 driven by a motor 1312. In this way, motor 1312 controls rotation of fingers 1301 and 1302 about an axis that corresponds to the axis of central threaded rod 1306, while motor 1308 effectively controls the opening and closing of pinch fingers 1301 and 1302.

By way of non-limiting example, FIGS. 14A and 14B illustrate, conceptually, operation of the pinching module of FIG. 13. FIG. 14A depicts the components in the "closed" position, in which pinch fingers 1301 and 1302 are in contact with each other. As shown in FIG. 14B, however, when threaded rod 1306 is rotated, anvil 1305 is forced downward.

As a result, side blocks 1303 and 1304—which are slideably coupled to anvil 1305 through, for example, 45-degree slots—are forced radially outward, causing pinch fingers 1301 and 1302 to open.

FIG. 15 is a conceptual block diagram of the automated system of FIG. 1 with additional components configured to track raw material to finished cigarettes using a bar code system. That is, systems in accordance with various embodiments are able to track, with a high degree of granularity, how raw material 101 is packaged (i.e., in cigarette form) and distributed.

As illustrated, cones 102 are provided with individual identification indicia (e.g., bar codes) 1502. These bar codes 1502, while illustrated as two-dimensional QR codes in the figure, may be any form of 1-D or 2-D bar code known now or later developed. The bar codes 1502 may be unique to each cone 102, or may be unique to particular lots or packages of cones. Similarly, raw material 101 might include a bar code 1502 or other form of identifier that uniquely characterizes the source and/or nature of the material and which can be read and stored by controller 103.

As illustrated, station 194 includes a barcode reader module 160 that is configured to read the bar codes 1502. This may be performed, for example, by a bar code reading device configured to observe the barcode through the openings 602 of carousel 522 as illustrated in FIG. 6. Accordingly, controller 103 is able to determine, and store, the unique identity of each cone at each index position during processing, and will also be able to store that data for later processing.

For example, the cone-tracking data may be transmitted over an external network 1590 to a server 1504 where it is stored in a database 1506. Database 1506 may then be interrogated by an individual or entity with proper credentials to determine the source of cones 102 and raw material 101 for a given finished cigarette 180. In one embodiment, for example, the cone-tracking data is stored within a blockchain 1510—i.e., a distributed and immutable ledger that might be public, private, or permissioned (e.g., Ethereum, EOS, or the like).

In one embodiment, system 100 further includes a weighing module mechanically coupled to collection module 120 for determining the weight of raw material 101 within the collection/grinding subsystem prior to processing. This information can also be transmitted via network 1590 to server 1504 and database 1506.

In accordance with some embodiments, system 500 is configured to communicate over a network with a mobile device or other remote application that allows an operator to control, monitor, and troubleshoot system 500 remotely. In a further embodiment, a third party is provided access to system 500 for producing cigarettes on demand or on a subscription basis. That is, the third party is charged through an online payment system for the number of finished cigarettes produced, much in the same way remote postage printing systems (e.g., the Pitney Bowes SendPro® system) monetize remote shipping labels and postage.

FIGS. 16-23 present various display screens associated with a user interface in accordance with various embodiments, and which may be implemented using software code executed by controller 103 (FIG. 1) and any displays and user interface components provided by UI 528 of FIG. 5. It will be appreciated that a wide range of user interfaces may be used in connection with the present system, and that FIGS. 16-23 merely present one non-limiting example of a set of user interface screens. The operation and purpose of the various user buttons, indicators, text blocks, and labels will be apparent in the context of the present invention to a person of ordinary skill in the art.

Figure 16:
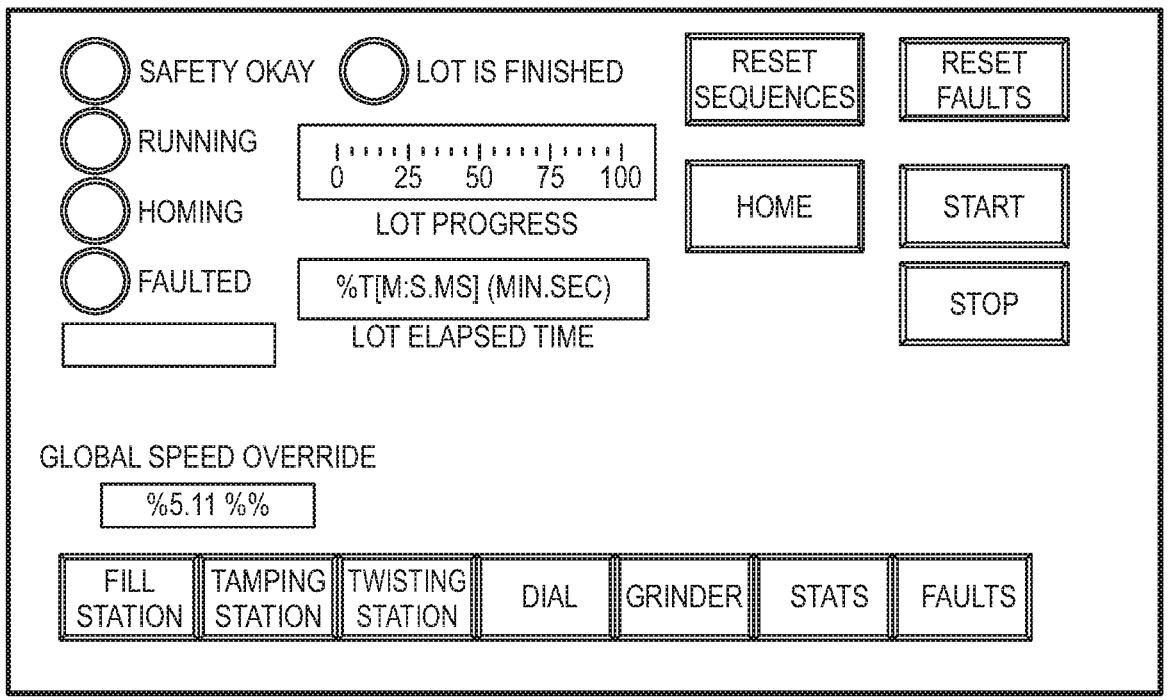

FIG. 16 illustrates a primary or Main screen, and displays the status of the entire machine with an array of indicators lights on the left side of the screen. More particularly, this screen displays the progress and elapsed time of the current lot and includes a text box that provides a description of the current fault (or error) code that occurred while the machine was running. This screen also includes the main start and stop buttons and other buttons that will direct the user to the rest of the screens described below.

Figure 17:
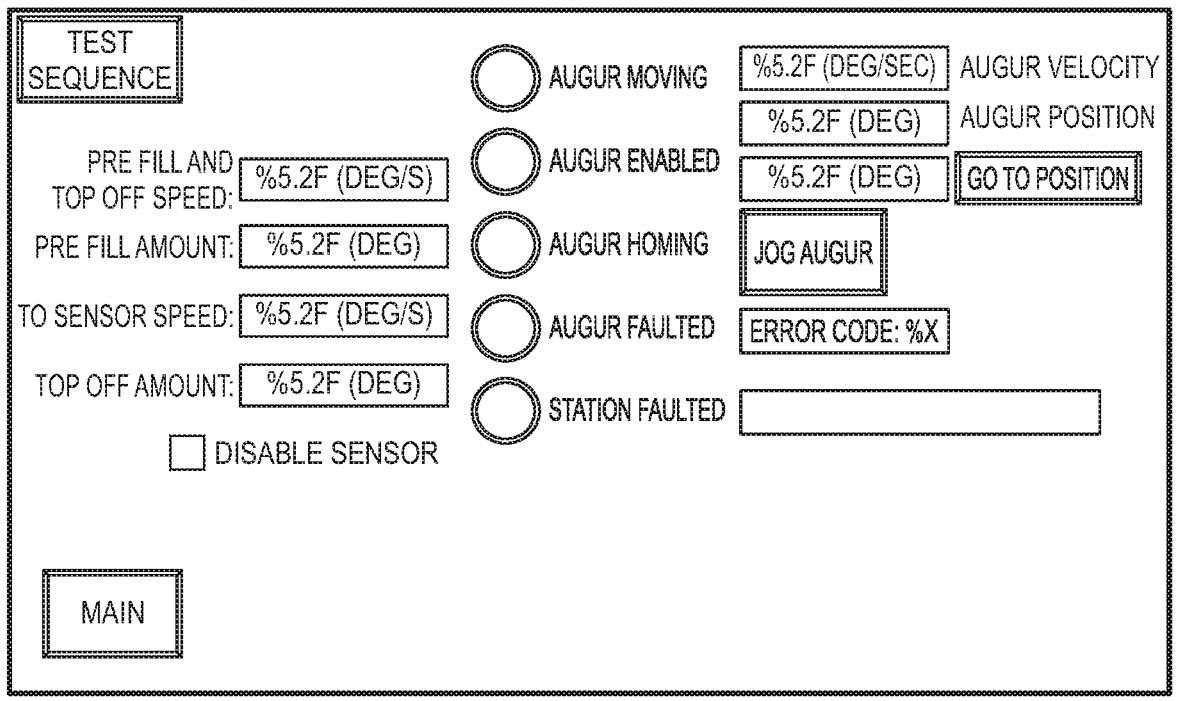

FIG. 17 illustrates a Fill Station screen. This screen shows the status of the auger motor using indicator lights in the center of the screen. It also allows the user to adjust certain parameters of the fill station using the input fields and it includes a text field that displays a description of any fault that has occurred for this station.

Figure 18:
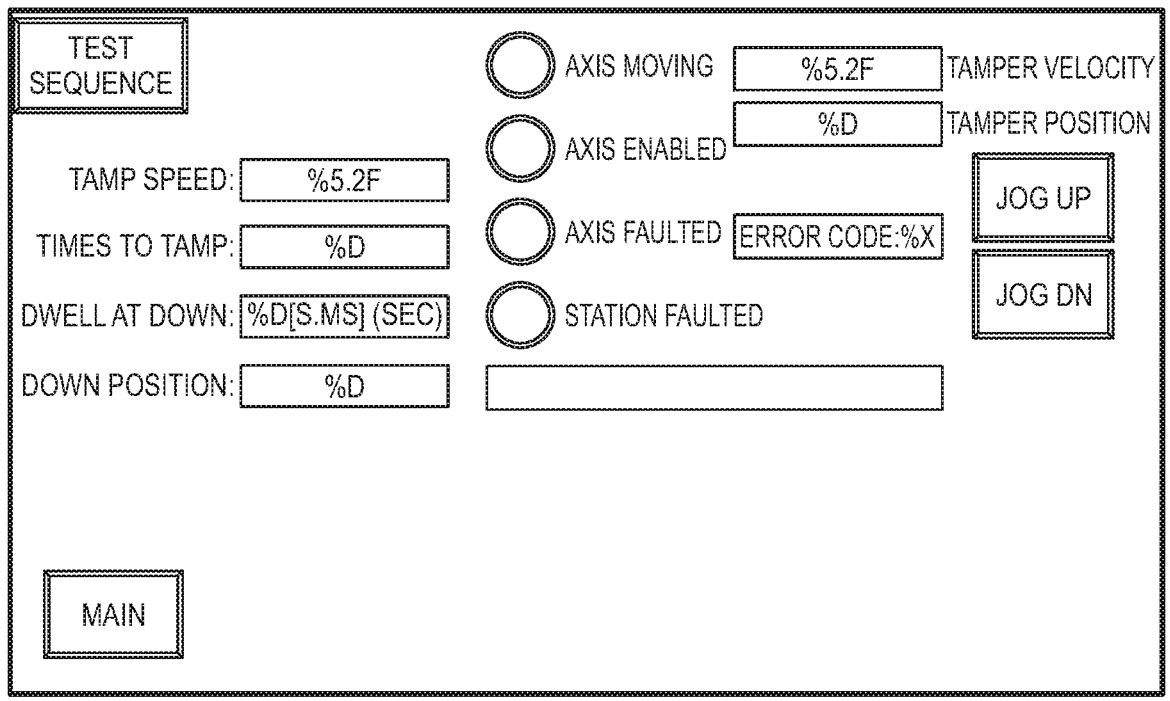

FIG. 18 illustrates a Tamping Station screen that includes indicator lights that show the status of the tamping actuator. It allows the user to set parameters of the tamping station such as: tamp speed, the number of tamps, and how far down the tamp mechanism extends. This interface also allows the user to jog the tamp mechanism up or down manually and includes a text field that displays a description of the fault that occurred for this station.

Figure 19:
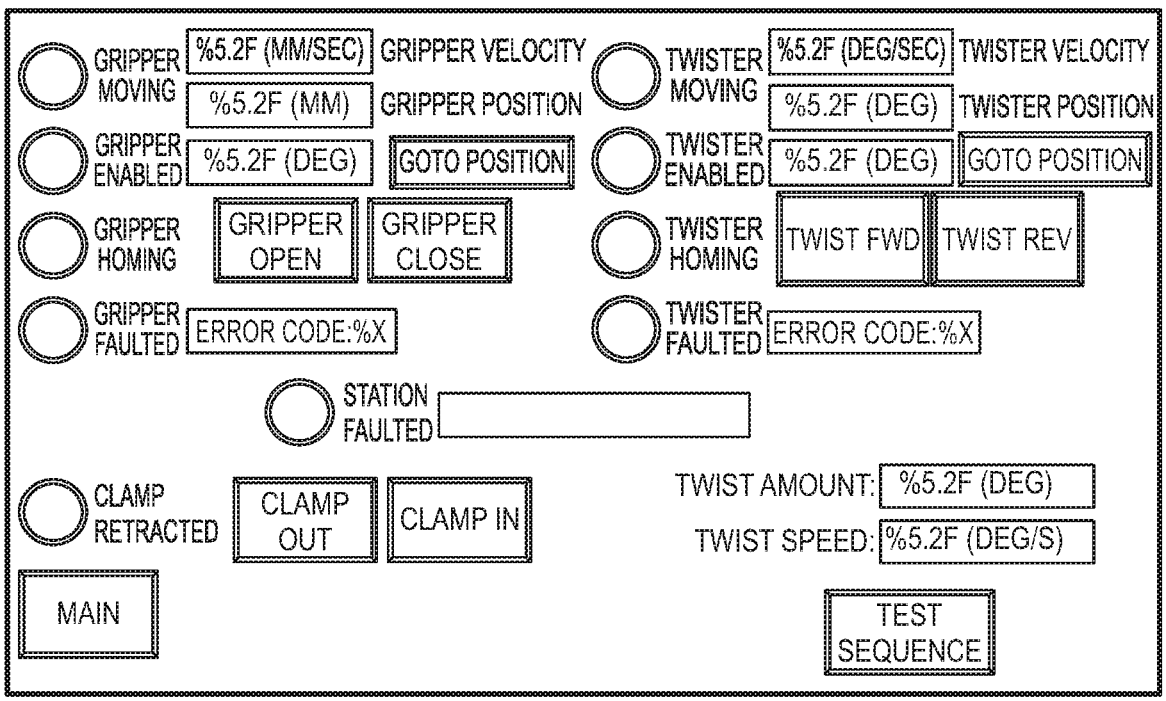

FIG. 19 illustrates a Twist Station screen. This screen allows the user to set gripper parameters such as: gripper velocity, gripper closed position, the number of twists to apply to the cigarette, and which direction to twist. This screen also has a text field that displays a description of the fault that occurred for this station.

Figure 20:
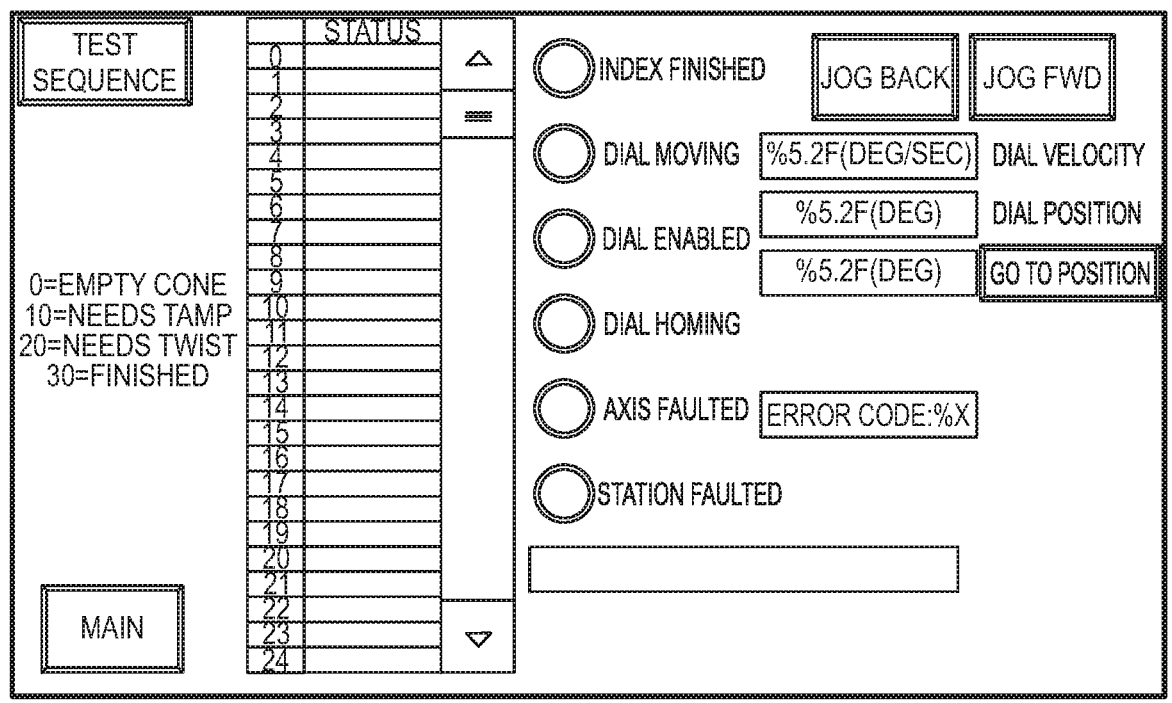

FIG. 20 illustrates a Dial screen. This screen allows the user to set the velocity of the dial indexer. It gives the user the ability to command the indexer to go to a certain position and the ability to jog the indexer either backward or forward. This screen also has a text field that displays a description of the fault that occurred for this station.

Figure 21:
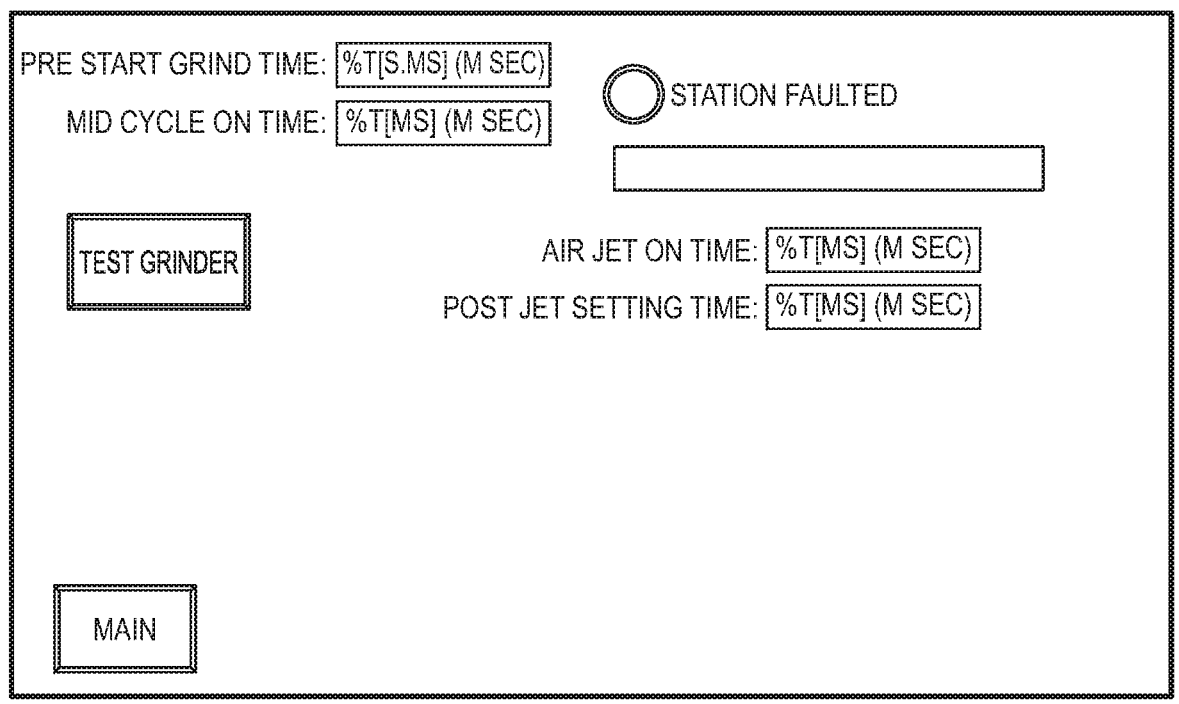

FIG. 21 illustrates a Grinder screen. This screen allows the user to set the length of time for grinding the product and the length of time that the air nozzles are turned on to help move the product from the hopper and into the funnel. This screen also includes a text field that displays a description of the fault that occurred for this station.

Figure 22:
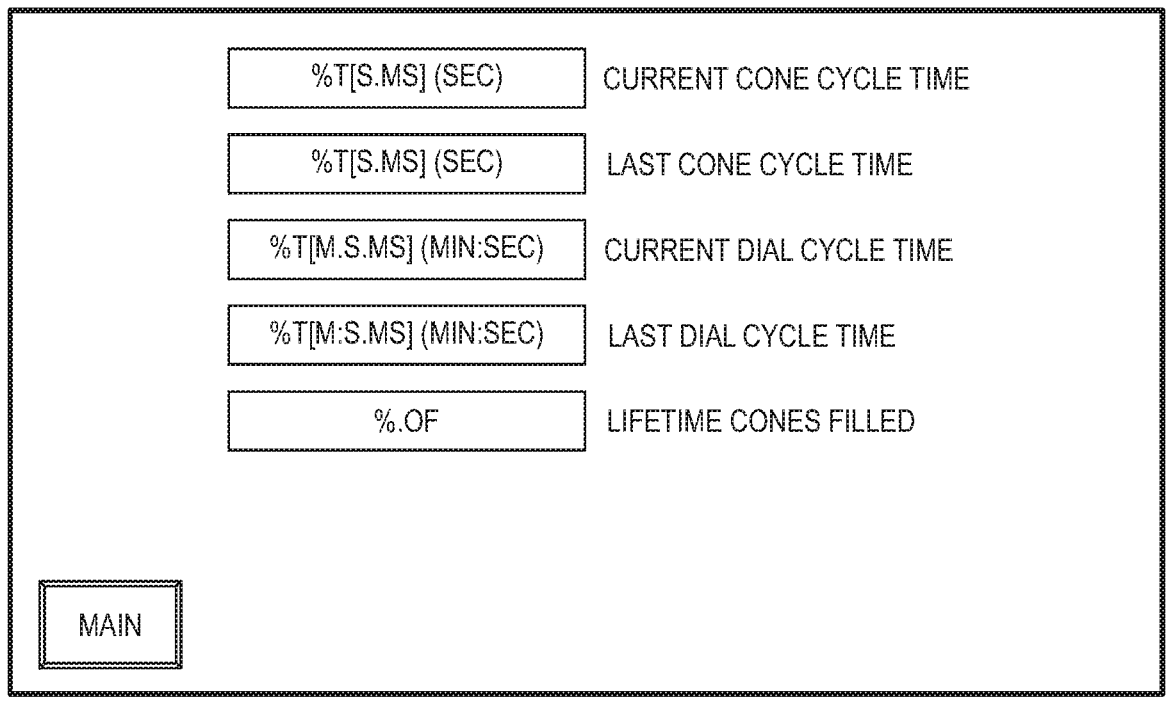

FIG. 22 is the Status screen. This screen displays various cycle time numbers as well as the total number of cones filled.

Figure 23:
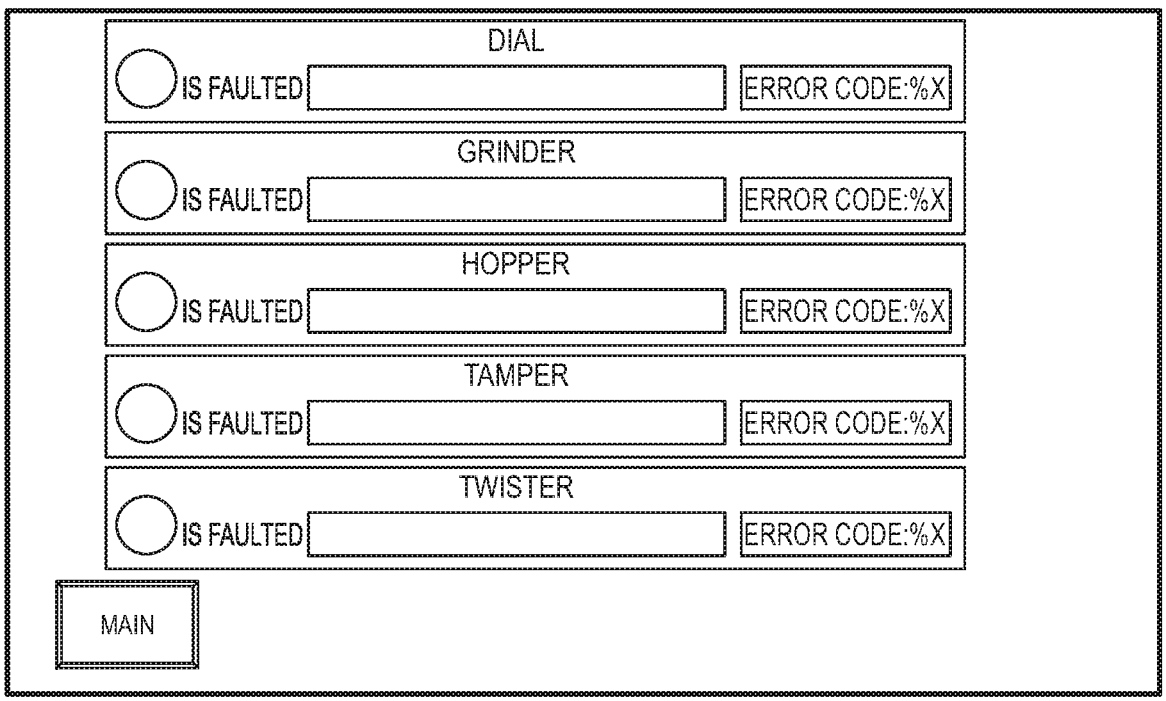

FIG. 23 illustrates a Fault screen. This screen displays a description of the fault that occurred on a specific station along with the fault code and an indicator light to show the active fault.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. An enclosed cigarette preparation system, to move pre-rolled cones, each having a sealed end and an open end, through a plurality of stations, comprising A filling module with an auger component configured to dispense a portion of shake material into the open end of pre-rolled cones to form loosely filled cones;

A pinching module configured to pinch-twist the open end of each of the pre-rolled shake material filled tamped cones to form rolled cigarettes, wherein the pinching module includes:

an anvil component having a threaded central bore configured to receive a motor-driven threaded rod;

first and second side blocks slideably engaging the anvil component at a predetermined, non-zero angle relative to the axis of the central bore; and first and second pinching fingers rigidly coupled, respectively, to the first and second side blocks;

wherein rotation of the motor-driven threaded rod causes translation of the anvil component along the axis of the central bore and lateral movement of the first and second pinching fingers orthogonal to the axis of the central bore.

2. The system of claim 1, wherein a rotatable pinching finger assembly includes a pair of opposing "Y"-shaped fingers configured to overlap in a closed position.

3. The system of claim 1, wherein the pinching module further includes a cone stabilization sub-system configured to selectably contact a portion of the pre-rolled cones to prevent rotation thereof during pinch-twisting.

4. The system of claim 3, wherein:

an indexing module includes a circular array of cups configured to hold the pre-rolled cones, each cup having an access opening; and the cone stabilization sub-system includes an actuatable gripping component configured to extend through the access openings to contact the pre-rolled cones held therein.

5. The system of claim 1, further including a bar-code reading module configured to read bar-codes printed on the pre-rolled cones and a data storage component configured to store tracking information that associates the read bar-codes to the shake material.

6. The system of claim 5, wherein the tracking information is stored within a publicly accessible blockchain.

7. A method for cannabis cigarette preparation, the method comprising:
  receiving, within an indexing module, a plurality of pre-rolled cones, each having a sealed end and an open end, and moving the pre-rolled cones through a plurality of stations as instructed by a controller;
  dispensing, at a first station, a portion of cannabis shake material into the open end of each of the pre-rolled cones to form loosely filled cones; compressing, at a second station, the cannabis shake material in each of the loosely filled cones to form tamped cones; and
  pinch-twisting, at a third station, the open end of each of the pre-rolled cones to form rolled cigarettes, wherein pinch-twisting the open end of pre-rolled cones to form rolled cigarettes is performed by a rotatable pinching finger assembly having an open position sufficient to encompass the open end of the pre-rolled cones, and a closed position configured to substantially compress the open end of the pre-rolled cones.

8. The method of claim 7, wherein the pinching-twisting is performed by: an anvil component having a threaded central bore configured to receive a motor-driven threaded rod; first and second side blocks slideably engaging the anvil component at a predetermined, non-zero angle relative to the axis of the central bore; and first and second pinching fingers rigidly coupled, respectively, to the first and second side blocks;
  wherein rotation of the motor-driven threaded rod causes translation of the anvil component along the axis of the central bore and lateral movement of the first and second pinching fingers orthogonal to the axis of the central bore.

9. The method of claim 7, wherein the pinch-twisting is performed by a rotatable pinching finger assembly including a pair of opposing "Y"-shaped fingers configured to overlap in a closed position.

10. The method of claim 7, further including selectably contacting a portion of the pre-rolled cones during the pinch-twisting to prevent rotation thereof.

11. The method of claim 7, further including providing a bar-code reading module configured to read bar-codes printed on the pre-rolled cones and a data storage component configured to store tracking information that associates the read bar-codes to the cannabis shake material.

* * * * *